US012766774B2

(12) United States Patent
Matsui et al.

(10) Patent No.: US 12,766,774 B2
(45) Date of Patent: Oct. 20, 2026

(54) LAMINATED FILM

(71) Applicant: Toray Industries, Inc., Tokyo (JP)

(72) Inventors: Hisato Matsui, Otsu (JP); Mayumi Tamura, Otsu (JP); Takayuki Uto, Otsu (JP); Wataru Gouda, Otsu (JP)

(73) Assignee: Toray Industries, Inc., Tokyo (JP)

( * ) Notice: Subject to any disclaimer, the term of this patent is extended or adjusted under 35 U.S.C. 154(b) by 264 days.

(21) Appl. No.: 18/685,976

(22) PCT Filed: Aug. 31, 2022

(86) PCT No.: PCT/JP2022/032771
§ 371 (c)(1),
(2) Date: Feb. 23, 2024

(87) PCT Pub. No.: WO2023/042661
PCT Pub. Date: Mar. 23, 2023

(65) Prior Publication Data

US 2024/0359387 A1 Oct. 31, 2024

(30) Foreign Application Priority Data

Sep. 17, 2021 (JP) ................................ 2021-151879

(51) Int. Cl.
*B29C 48/21* (2019.01)

(52) U.S. Cl.
CPC ........ *B29C 48/21* (2019.02); *B29K 2995/003* (2013.01); *B29K 2995/005* (2013.01);
(Continued)

(58) Field of Classification Search
None
See application file for complete search history.

(56) References Cited

U.S. PATENT DOCUMENTS 5,103,337 A * 4/1992 Schrenk ................. G02B 5/305 359/359
2007/0026223 A1* 2/2007 Osada ................. H01M 50/133 428/480

(Continued)

FOREIGN PATENT DOCUMENTS

JP 3067863 B2 7/2000
JP 2008162289 A 7/2008

(Continued)

OTHER PUBLICATIONS

International Search Report (PCT/ISA/210) with English translation and Written Opinion (PCT/ISA/237) mailed on Nov. 15, 2022, by the Japanese Patent Office as the International Searching Authority for International Application No. PCT/JP2022/032771.

(Continued)

*Primary Examiner* — Samir Shah
(74) *Attorney, Agent, or Firm* — Buchanan Ingersoll & Rooney PC

(57) ABSTRACT

The present invention addresses the problem of providing a laminated film that has further uniform properties regarding optical characteristics and the like, and that can maintain said properties for a further extended period of time. This laminated film is characterized by comprising two or more different types of thermoplastic resin layers and is characterized in that, when ratios of interface layer thicknesses analyzed through GCIB-TOF-SIMS with respect to the film thickness are calculated in all types of interfaces formed by the different thermoplastic resin layers, the lowest value thereof is $1.0\times10^{-4}$–$1.0\times10^{-2}$.

17 Claims, 10 Drawing Sheets

(52) U.S. Cl.
CPC ................. *B29K 2995/0097* (2013.01); *B29K 2995/0098* (2013.01)

(56) References Cited

U.S. PATENT DOCUMENTS

| | | | | |
|---|---|---|---|---|
| 2014/0340740 | A1 | 11/2014 | Saito | |
| 2021/0405439 | A1 * | 12/2021 | Matsuo ................ | G02B 5/3083 |

FOREIGN PATENT DOCUMENTS

| | | | | |
|---|---|---|---|---|
| JP | 2016175412 | A | 10/2016 | |
| JP | 2017149142 | A | 8/2017 | |
| JP | 2018054800 | A | 4/2018 | |
| JP | 2019171874 | A | 10/2019 | |
| JP | 2019202545 | A | 11/2019 | |
| JP | 2020020006 | A | 2/2020 | |
| JP | 2021045924 | A | 3/2021 | |
| WO | 2013077274 | A1 | 5/2013 | |
| WO | WO-2020121913 | A1 * | 6/2020 | ........... G02B 6/0088 |
| WO | 2021/176316 | A1 | 9/2021 | |

OTHER PUBLICATIONS

Extended European Search Report issued Sep. 16, 2025, by the European Patent Office in corresponding European Patent Application No. 22869808.0-1102. (8 pages).

* cited by examiner

LAMINATED FILM

CROSS REFERENCE TO RELATED APPLICATIONS

This application is the U.S. National Phase of PCT/JP2022/032771, filed Aug. 31, 2022, which claims priority to Japanese Patent Application No. 2021-151879, filed Sep. 17, 2021, the disclosures of these applications being incorporated herein by reference in their entireties for all purposes.

FIELD OF THE INVENTION

The present invention relates to a laminated film obtained by laminating a plurality of types of thermoplastic resins without delamination or layer disorder.

BACKGROUND OF THE INVENTION

A laminated film obtained by co-extruding or laminating a plurality of different kinds of thermoplastic resins can obtain dynamic characteristics that cannot be realized by a film made of a single thermoplastic resin, and can also perform functional modification such as heat resistance, dimensional stability, and impact resistance as in the case of copolymerizing/blending/polymer alloying a plurality of thermoplastic resins. Further, forming such a laminated film causes an interface of a thermoplastic resin to form, and it is also possible to exhibit characteristics such as an optical function utilizing light interference and total reflection at the interface and improvement in tear strength. From such a point, the above-described laminated film has been actively studied in the development of a new functional film.

Among them, a coextrusion-type laminated film obtained by leading a plurality of different thermoplastic resins from individual extruders and laminating the thermoplastic resins with a laminating device such as a square mixer or a feed block, a multilayered spinneret such as a multi-manifold die, or the like is preferably studied because a desired laminated configuration can be more easily and uniformly formed as compared with a laminate-type laminated film (Patent Documents 1 to 3). In addition, in such a coextrusion-type laminated film, since a laminated structure is formed in the device controlled at a constant temperature, it is easy to select and laminate thermoplastic resins having similar heat resistance.

PATENT DOCUMENT

Patent Document 1: Japanese Patent Laid-open Publication No. 2019-202545

Patent Document 2: Japanese Patent Laid-open Publication No. 2008-162289

Patent Document 3: Japanese Patent Laid-open Publication No. 2019-171874

Patent Document 4: Japanese Patent Laid-open Publication No. 2020-20006

Patent Document 5: Japanese Patent Laid-open Publication No. 2017-149142

Patent Document 6: Japanese Patent Laid-open Publication No. 2016-175412

SUMMARY OF THE INVENTION

However, in the production of a coextrusion-type laminated film as shown in Patent Documents 1 to 3, in a process from the construction of a molten laminate in a laminating device to the ejection of the molten laminate into a desired shape from a spinneret, lamination disorder may occur at a lamination interface due to resin fluidity peculiar to a constrained flow field in a polymer flow path. For example, when thermoplastic resins having a common skeleton structure such as polyester resins and polyolefin resins are laminated, the lamination disorder can be relatively easily suppressed by matching the viscosity characteristics by adjusting the extrusion temperature condition, but when thermoplastic resins having a large difference in physical/chemical properties such as a skeleton structure and viscosity/viscoelastic properties are laminated, the lamination disorder is remarkably generated, and it is difficult to suppress the lamination disorder.

This lamination disorder causes continuous variation in the layer thickness of each thermoplastic resin layer in a flow direction/width direction during formation of the laminated film, leading to poor appearance of the laminated film. Further, in an optical laminated film utilizing an interference effect between light beams reflected at different interfaces, the thickness of each layer needs to be controlled with high accuracy because the reflectance and reflection band of the laminated film obtained according to the thickness change of each thermoplastic resin layer change, and when the lamination disorder occurs in the production process, a laminated film exhibiting stable optical characteristics cannot be obtained. Examples of a method for suppressing this lamination disorder include a method in which thermoplastic resin layers are joined immediately before being discharged from a spinneret as an extrusion process. However, to obtain a wide laminated film while increasing the number of laminated layers, it is inevitable to increase the size and complexity of the device.

Further, in the lamination of thermoplastic resins having different skeleton structures and physical/chemical properties, strong connection between molecules such as intermolecular force, π-π stacking, and hydrogen bonding cannot be obtained, and the resulting laminated film is likely to be peeled at the layer interface of the thermoplastic resin layer. As a result, the thermoplastic resins cannot be co-stretched with high accuracy in the stretching step, the stretched state tends to vary particularly in a film flow direction, and the resulting laminated film tends to be delaminated.

In particular, in a laminated film obtained by laminating a plurality of resins in a certain repeating unit, a light reflection effect due to interference between reflected light at the interface can be obtained by controlling the layer thickness and refractive index of each layer. However, with the delamination as described above, the effect cannot be sufficiently obtained, and thus, the laminated film has unevenness in functions such as optical properties, and it is difficult to maintain the original function for a long period of time.

An object of the present invention is to provide a laminated film that solves the above problems, has more uniform properties such as optical properties, and can maintain the properties for a longer period of time.

To solve the above-described problems, the present invention includes the following configurations. That is, a laminated film including two or more different types of thermoplastic resin layers, the laminated film having a lowest value of a ratio of an interface layer thickness to a film thickness of $1.0\times10^{-4}$ or more and $1.0\times10^{-2}$ or less in all types of interfaces formed of the different types of thermoplastic resin layers, the interface layer thickness being analyzed through GCIB-TOF-SIMS.

According to the present invention, as a result of reducing lamination disorder and delamination, a laminated film having more uniform properties such as optical properties and capable of maintaining the properties for a longer period of time can be obtained.

DETAILED DESCRIPTION OF EMBODIMENTS OF THE INVENTION

Figure 1:
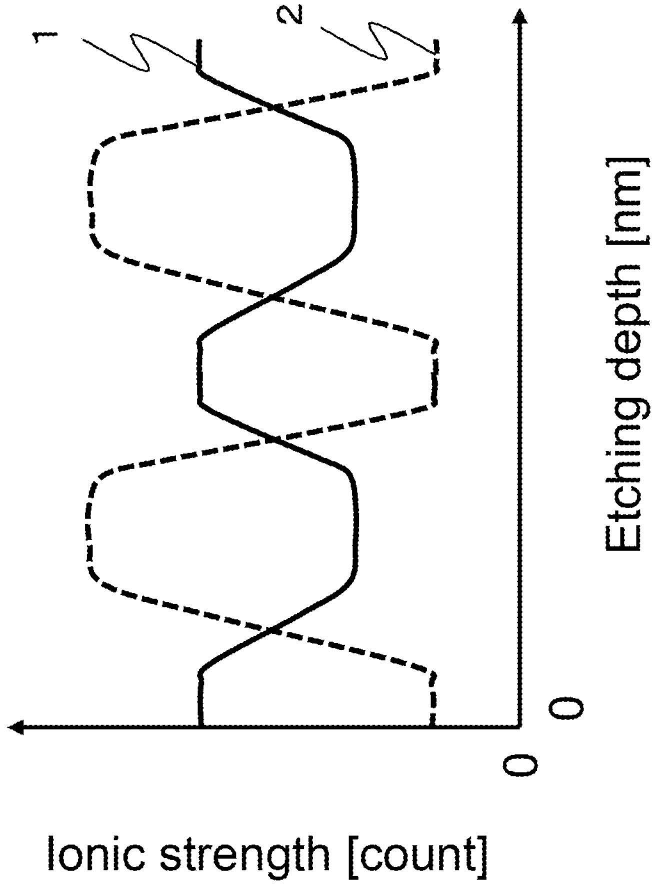
FIG. 1 is a schematic view showing a result of GCIB-TOF-SIMS measurement of a laminated film having a (AB)x configuration.

A laminated film according to the present invention will be described in detail below. The laminated film of the present invention is a laminated film including two or more different types of thermoplastic resin layers, the laminated film having a lowest value of a ratio of an interface layer thickness to a film thickness of $1.0\times10^{-4}$ or more and $1.0\times10^{-2}$ or less in all types of interfaces formed of the different types of thermoplastic resin layers, the interface layer thickness being analyzed through GCIB-TOF-SIMS.

The laminated film of the present invention is required to have two or more different types of thermoplastic resin layers. In the laminated film of the present invention, the thermoplastic resin layers being "different" refers to a case corresponding to at least one of the following: (1) having different compositions, (2) having different glass transition temperatures and melting points in differential scanning calorimetry (DSC), and (3) having different contrasts in images after dyeing when observed in section by transmission electron microscopy (TEM).

The phrase "having different compositions" means that it does not satisfy the following condition that is regarded as "having the same composition". The phrase "having the same composition" refers to a case where repeating units of a chemical structure of the thermoplastic resins constituting the respective thermoplastic resin layers are common at 95 mol % or more and 100 mol % or less, or a case where components are common at 95 mass % or less and 100 mass % or less when components of the respective thermoplastic resin layers are compared.

For example, in the former case, polyethylene terephthalate has, as a main constituent unit, a constituent unit (ethylene terephthalate unit) in which an ethylene glycol unit and a terephthalic acid unit are bonded by an ester bond, but when the amount of a copolymerization component exceeds 5 mol % while resins constituting the layers have a common chemical structure of polyethylene terephthalate, such as a layer formed of homopolyethylene terephthalate and a layer formed of polyethylene terephthalate copolymerized with 10 mol % of isophthalic acid, the compositions of the layers are considered to be different. In the latter case, as in a layer formed only of homopolyethylene terephthalate and a layer containing 90 mass % of homopolyethylene terephthalate and the remaining 10 mass % of which is another component, when components having the same constituent as a main component but more than 5 mass % are different from each other, the compositions of the layers are considered to be different. The repeating unit structure of a specific composition/chemical structure of each thermoplastic resin layer can be identified using infrared spectroscopy (FT-IR method or nano IR method), a gas chromatography/mass spectrometer (GC-MS), a nuclear magnetic resonance device (NMR), or the like by grasping the layer thickness of each thermoplastic resin layer according to the method described in the layer configuration of the measurement method described later, and then cutting out the thermoplastic resin layer, or cutting out the layer to obtain the outermost layer.

On the other hand, when it is difficult to identify the compositions by the above method after extraction for each thermoplastic resin layer, it can be determined that the thermoplastic resin layers constituting the laminated film are "different" when the layers exhibit different melting points and/or glass transition point temperatures in differential scanning calorimetry (DSC). In the present invention, showing different melting points and different glass transition temperatures means that the melting points and the glass transition temperatures are different by 0.1° C. or more, preferably 2° C. or more. In the measurement temperature range of 25° C. or more and 300° C. or less described in the section of differential scanning calorimetry (DSC) in the measurement method described later, the thermoplastic resins do not exhibit a glass transition temperature and a melting point in some cases. When one thermoplastic resin layer exhibits a glass transition temperature or a melting point and the other thermoplastic resin layer does not exhibit a glass transition temperature or a melting point, it cannot be calculated as a difference in glass transition temperature or a difference in melting point, but it is interpreted that the thermoplastic resins are different.

In the above two methods, it is necessary to separate the corresponding layer from the film for analysis, but separation of the layer may be difficult. Thus, in the present invention, for convenience, when a layer interface due to a contrast difference can be recognized in a sectional image observed by transmission electron microscope observation, and when it can be confirmed by the method described in the section of the layer interface (contrast difference) in the measurement method to be described later that a difference between average values of brightness of two adjacent layers is larger than any of standard deviations of brightness in each layer of the adjacent thermoplastic resin layers, it is determined that the contrast of the image after dyeing is different, and the compositions of the adjacent thermoplastic resin layers are "different". This contrast difference is caused by difference in scattering of electron beams, crystal diffraction, and the like between thermoplastic resin layers. Thus, when the compositions of the thermoplastic resin layers are different in accordance with the above-described criteria, the crystallinity and the electron density state are different depending on the type and copolymerization amount of each thermoplastic resin, and the electron dyeing state is also different. For this reason, when thermoplastic resin layers having different compositions are provided, each layer can be visually recognized as a layer structure having a contrast difference in a sectional image of the laminated film.

Representative thermoplastic resins used for forming the thermoplastic resin layer of the laminated film of the present invention are shown below, but the thermoplastic resin that can be used in the present invention is not limited to those described below. Examples thereof include polyolefin resins represented by polyethylene, polypropylene, poly(1-butene), poly(4-methylpentene), polyisobutylene, polyisoprene, polybutadiene, polyvinylcyclohexane, polystyrene, poly($\alpha$-methylstyrene), poly(p-methylstyrene), polynorbornene, polycyclopentene and the like, polyamide resins represented by nylon 6, nylon 11, nylon 12, nylon 66 and the like, copolymer resins of vinyl monomers represented by ethylene/propylene copolymer, ethylene/vinyl cyclohexane copolymer, ethylene/vinyl cyclohexene copolymer, ethylene/alkyl acrylate copolymer, ethylene/acrylic methacrylate copolymer, ethylene/norbornene copolymer, ethylene/vinyl acetate copolymer, propylene/butadiene copolymer, isobutylene/isoprene copolymer, vinyl chloride/vinyl acetate copolymer and the like, acrylic resins represented by polyacrylate, polyisobutyl methacrylate, polymethacrylate, polymethyl methacrylate, polybutyl acrylate, polyacrylamide, polyacrylonitrile and the like, polyester resins represented by polyethylene terephthalate, polypropylene terephthalate, polybutylene terephthalate, polyethylene-2,6-naphthalate and the like, polyether resins represented by polyethylene oxide, polypropylene oxide, and polyacrylate glycol, cellulose ester resins represented by ethyl cellulose, diacetyl cellulose, triacetyl cellulose, propionyl cellulose, butyryl cellulose, acetyl propionyl cellulose, and nitrocellulose, biodegradable polymers represented by polylactic acid, polybutyl succinate and the like, and polyvinyl chloride, polyvinylidene chloride, polyvinyl alcohol, polyvinyl butyral, polyacetal, polyglucholic acid, polycarbonate, polyketone, polyether sulfone, polyether ether ketone, modified polyphenylene ether, polyphenylene sulfide, polyether imide, polyimide, polysiloxane, tetrafluoroethylene resin, trifluoroethylene resin, trifluoroethylene chloride resin, ethylene tetrafluoride-6 propylene fluoride copolymer, and polyvinylidene fluoride.

One type of these thermoplastic resins may be used alone, or two or more types of thermoplastic resins may be used as a blend or alloy. By performing blending or alloying, physical/chemical properties that cannot be obtained from one thermoplastic resin can be obtained, and in the lamination of thermoplastic resin layers having greatly different skeleton structures, adhesion between layers at the interface can be improved, and the interface layer thickness, which is important in the present invention, can be further increased when a component common to the polymer skeleton structure contained in the thermoplastic resin layer on the opposite side can be imparted to the thermoplastic resin layer on one side of the adjacent thermoplastic resin layers. In the laminated film of the present invention, the thermoplastic resin for forming the thermoplastic resin layer is particularly preferably selected from a polyolefin resin, a polyester resin, an acrylic resin, and a polycarbonate resin among the above from the viewpoint of the rheological properties related to strength, heat resistance, transparency, and lamination properties.

Among them, as a preferable polyester resin preferably used, a polyester obtained by polymerization from a monomer mainly containing an aromatic dicarboxylic acid or an aliphatic dicarboxylic acid and a diol is preferable.

Here, examples of the aromatic dicarboxylic acid include terephthalic acid, isophthalic acid, phthalic acid, 1,4-naphthalene dicarboxylic acid, 1,5-naphthalene dicarboxylic acid, 2,6-naphthalene dicarboxylic acid, 4,4'-diphenyl dicarboxylic acid, 4,4'-diphenyl ether dicarboxylic acid, and 4,4'-diphenyl sulfone dicarboxylic acid. Examples of the aliphatic dicarboxylic acid include adipic acid, suberic acid, sebacic acid, dimer acid, dodecanedioic acid, cyclohexanedicarboxylic acid, and ester derivatives thereof. Among them, terephthalic acid and 2,6-naphthalenedicarboxylic acid are preferable. These acid components may be used alone or in combination of two or more, and may be partially copolymerized with an oxyacid such as hydroxybenzoic acid.

Examples of the diol component include ethylene glycol, 1,2-propanediol, 1,3-propanediol, neopentyl glycol, 1,3-butanediol, 1,4-butanediol, 1,5-pentanediol, 1,6-hexanediol, 1,2-cyclohexanedimethanol, 1,3-cyclohexanedimethanol, 1,4-cyclohexanedimethanol, diethylene glycol, triethylene glycol, polyalkylene glycol, 2,2-bis(4-hydroxyethoxyphenyl) propane, isosorbate, and spiroglycol. Among them, ethylene glycol is preferably used. These diol components may be used alone or in combination of two or more.

Among the polyester resins, it is particularly preferable to use a polyester resin selected from polyethylene terephthalate and a copolymer thereof, polyethylene naphthalate and a copolymer thereof, polybutylene terephthalate and a copolymer thereof, polybutylene naphthalate and a copolymer thereof, polyhexamethylene terephthalate and a copolymer thereof, and polyhexamethylene naphthalate and a copolymer thereof.

The laminated film of the present invention is required to have two or more different types of thermoplastic resin layers. Specifically, the phrase "having two different types of thermoplastic resin layers" refers to a case of having a laminated configuration in which two "different" types of thermoplastic resin layers are alternately laminated according to the above definition, and when the different thermoplastic resin layers are defined as layer A and layer B in the order of being disposed from the outermost surface of the laminated film, it refers to a laminated film formed of repeating units of (AB)x. Note that x is a natural number representing the number of repeating units, and the same applies to the description of the laminated unit below.

In the present invention, hereinafter, different thermoplastic resin layers constituting the laminated film are defined as layer A, layer B, layer C, . . . in the alphabetical order in the order in which they appear first when viewed from the outermost surface of the laminated film, and the thermoplastic resin as a main component of each thermoplastic resin layer is defined as thermoplastic resin A, thermoplastic resin B, thermoplastic resin C, . . . . The main component described herein refers to a component contained in the layer in an amount of more than 50 mass % and 100 mass % or less. Examples of the accessory component that is not the main component include an inorganic component other than the thermoplastic resin, a low molecular organic component, and the like, and specific examples thereof include a light absorber (ultraviolet absorber, dye, pigment, and heat ray absorber), an antioxidant, a light stabilizer, a quencher, a heat resistant stabilizer, a weather resistant stabilizer, an organic lubricant, a filler, an antistatic agent, a nucleating agent, and a flame retardant.

Among these accessory components, an ultraviolet absorber is preferably included for the purpose of suppressing photodegradation by reaction competition since deterioration may be promoted by absorbing ultraviolet rays having strong energy depending on the type of thermoplastic resin constituting each layer. Further, the light absorber itself may be affected by degradation due to heat/oxygen or photodegradation due to reaction with ultraviolet rays or oxygen in the resin extrusion process. Thus, it is preferable to add an antioxidant for the former, and a light stabilizer and a quencher for the latter, both as additives, into the layer containing a thermoplastic resin that may deteriorate.

In the same manner, having three or more different thermoplastic resin layers specifically refers to a laminated film in which the laminated film of the present invention has a repeating unit formed of three or more different thermoplastic resin layers. For example, in the case of an aspect having three different types of thermoplastic resin layers, the three different types of thermoplastic resin layers may be formed of thermoplastic resins having different skeleton structures, or thermoplastic resin layers having two different skeleton structures may be used, and the three thermoplastic resin layers may be designed to have different mixing ratios or copolymerization amounts.

When the laminated film of the present invention has three different types of thermoplastic resin layers, examples of the certain repeating unit may include (ABC)x, (ABCB)x, (ABABC)x, (ABCBCB)x, and (ACBCBC)x when the different thermoplastic resin layers are defined as layer A, layer B, and layer C in the order of being disposed from the outermost surface of the laminated film. Among them, to laminate thermoplastic resins having different physical/chemical properties such as skeleton structure and viscoelasticity/viscosity characteristics while controlling the interface layer thickness of the laminated film, it is preferable in terms of design that the number of combinations of adjacent thermoplastic resin layers forming the layer interface is small. Specifically, examples of the interface formed of three different types of thermoplastic resin layers include three types of an A-B interface, a B-C interface, and a C-A interface, but in the repeating units, (ABCB)x and (ABCBCB)x have only two types of an A-B interface and a B-C interface. In such an aspect, as the thermoplastic resin design for increasing the interface layer thickness involved in lamination disorder and adhesion between layers, only the resin design of one layer of the layer A, the layer B, and the layer C and the other two layers adjacent thereto may be considered. Thus, the aspect as described above is preferable from the viewpoint of easily forming a laminated film having high adhesion between layers without lamination disorder.

Subsequently, when the laminated film of the present invention has four different thermoplastic resin layers, thermoplastic resin layers having four different compositions may be formed by mixing/copolymerizing/polymer alloying two different thermoplastic resins having different skeletal structures, or thermoplastic resin layers having four different compositions may be formed by mixing/copolymerizing/polymer alloying three different thermoplastic resins having different skeletal structures. Four types of thermoplastic resin layers having completely different skeleton structures may be used. When the different thermoplastic resin layers are defined as the layer A, the layer B, the layer C, and the layer D in this order from the outermost surface of the laminated film, examples of the certain repeating unit include (ABCD)x, (ABCDB)x, (ABCDC)x, (ABACAD)x, (ABCABD)x, (ABCBDB)x, (ABCBCD)x, (ABCDAB)x, (ABCDAC)x, (ABCDBC)x, (ABCDCD)x, (ABCDCB) X, (ABCABCD)x, and (ABCBDBCB)x. Of course, the arrangement of the thermoplastic resin layers in the repeating unit is not limited to the above. Even when the laminated film is formed of four types of thermoplastic resin layers, as in the case of being formed of the three types of thermoplastic resin layers, the number of types of interfaces formed of different thermoplastic resin layers is preferably small, and among the repeating units, (ABCDCB)x, having only three types of an A-B interface, a B-C interface, and a C-D interface, is preferable because resin design for increasing the interface layer thickness is simple.

Further, a laminated film having five or more thermoplastic resin layers can be interpreted in the same manner, but as the number of types of thermoplastic resin layers increases, the number of extruders for simultaneous extrusion increases, and resin design for realizing no lamination disturbance and no interfacial peeling also becomes more complicated. Further, since the polymer flow path step in the laminating device in which the resin layers are joined is also complicated, it is not realistic to use five or more types of resins. For this reason, the number of types of thermoplastic resin layers contained in the laminated film of the present invention is preferably 2 to 4, and more preferably 2 or 3.

Among them, having three different types of thermoplastic resin layers is preferable because even when thermoplastic resins having completely different physical/chemical properties such as a skeleton structure and viscoelasticity/viscosity characteristics are laminated, a copolymer resin or an alloy resin having a skeleton component common to adjacent thermoplastic resin layers or a blended thermoplastic resin is used as a main component for the thermoplastic resin layers disposed between the thermoplastic resin layers as described later, or a formulation in which an unreacted functional group reactive with an unreacted functional group component contained in the thermoplastic resin layer on one side adjacent thermoplastic resin layers is contained in the other side the adjacent thermoplastic resin layers is used, whereby the compatibility between the thermoplastic resin layers can be increased and the interface layer thickness can be made thicker.

Further, to apply the concept of improving the compatibility between the thermoplastic resins adjacent at the interface by the third intermediate thermoplastic resin layer for increasing the interface layer thickness to the entire laminated film, a laminated film having a repeating unit of (ABCB)x among the repeating units is most preferable with a simple laminated configuration.

The laminated film of the present invention preferably has an aspect in which the same thermoplastic resin layer is disposed as the outermost layer on both surface layers while having the repeating unit. Taking the above repeating unit as an example, it is an aspect represented by a laminated pattern such as (AB)xA, (ABCB)xA, and (ABCDCB)xA. Since both surface layers are formed of a layer containing the same thermoplastic resin as a main component, in the production method described later, it is not necessary to finely adjust the roll temperature, the material, and the like in accordance with the thermal characteristics of the thermoplastic resin layer in contact with the roll to prevent sticking between the roll and the film during roll stretching. Thus, in accordance with the thermal characteristics of the thermoplastic resin constituting the thermoplastic resin layers disposed on both outermost layers, a laminated film can be obtained under the same film formation conditions as in the case of forming a single film containing the thermoplastic resin as a main component.

Further, the thermoplastic resin constituting the thermoplastic resin layer positioned at the outermost layer is preferably a layer containing a crystalline thermoplastic resin as a main component. When the thermoplastic resin layer positioned at the outermost layer contains an amorphous resin as a main component, and a biaxially stretched laminated film is obtained by a production method described later, film formation failure or deterioration of a surface state may occur due to sticking to production equipment such as a roll or a clip, or a laminated film having uniform physical properties and optical characteristics in a film plane is not obtained in some cases because stress is not generated during stretching and uniform stretching cannot be performed. Crystallinity of the resin may be confirmed by cutting and extracting the thermoplastic resin layer, and checking the presence or absence of the enthalpy of fusion using a differential scanning calorimetry (DSC) device. Measurement through DSC can be performed according to JIS-K-7122 (1987), and details thereof will be described later.

In the laminated film of the present invention, from the viewpoint of reducing delamination and suppressing occurrence of coloring unevenness, it is important that the laminated film has a lowest value of a ratio of an interface layer thickness to a film thickness of $1.0\times10^{-4}$ or more and $1.0\times10^{-2}$ or less in all types of interfaces formed of the different types of thermoplastic resin layers, the interface layer thickness being analyzed through GCIB-TOF-SIMS. The all types of interfaces formed by different thermoplastic resin layers in the present invention mean all types of interfaces present in repeating units of a laminated film, and for example, in the case of a laminated film having a repeating unit (AB)x formed of two types of thermoplastic resin layers, the interface refers to an A-B interface. In the case of a laminated film formed of three types of thermoplastic resin layers, for example, in the case of a laminated film having a repeating unit of (ABC)x, three types of an A-B interface, a B-C interface, and a C-A interface are indicated, and in the case of a laminated film having a repeating unit of (ABCB)x, two types of an A-B interface and a B-C interface are indicated. In addition, as will be described later, a hard coat layer, an easily adhesive layer, a gas barrier layer, a tacky layer, and the like may be separately provided as a functional layer on the outermost surface of the laminated film, and accordingly, an interface is formed between the outermost thermoplastic resin layer constituting the laminated film, but the interface in the present invention focuses only on the interface constituting the repeating unit of the laminated film.

In the laminated film of the present invention, the interface layer thickness analyzed by GCIB-TOF-SIMS is used as the interface layer thickness. The interface layer thickness refers to a layer thickness of an interface portion formed by mixing components of different adjacent thermoplastic resins via physical adhesion, chemical adhesion, molecular diffusion, or the like, and in the past, there has been reported an example in which the interface layer thickness is calculated by a method of calculating the interface layer thickness from a phase change of the interface portion using an intermolecular force microscope (AFM) or a method of calculating the interface layer thickness from a contrast change of an image of the interface portion using a transmission electron microscope (TEM) (Patent Documents 4 to 6).

However, in the former AFM analysis, when the resolution of the device is low and the layer thickness of each thermoplastic resin layer is a thin film on the order of nanometers, the interface layer thickness cannot be accurately grasped. In the latter case of TEM analysis, analysis on the order of nanometers is possible, but there is a problem that how the interface layer thickness is captured changes depending on the contrast setting of the image. In TEM analysis, when thermoplastic resin layers having different skeleton structures and physical/chemical properties, which are objects of the present invention, are laminated, and adhesion between the layers is poor, voids are generated due to interfacial peeling at the time of sectional cutting for interface formation. Thus, undesirable black contrast (a portion having no electron density information looks black) occurs in the interface portion, and there is also a disadvantage that accurate interface thickness information cannot be obtained.

In the present invention, GCIB-TOF-SIMS is focused as a method capable of analyzing the interface layer thickness without peeling with sectional cutting even for a laminated film having a layer thickness of nanometer order. GCIB-TOF-SIMS analysis is a method for detecting structural information of an organic substance on a sample surface, and can continuously analyze intensity distribution of an organic ion component in a depth direction by combining etching using a gas cluster ion beam (GCIB). In the present method, analysis with high resolution in the order of nanometers is possible, and although the number of measurement points is limited, surface layer cutting is performed in advance to the interface portion to be analyzed, and thus the intensity distribution of the organic component in the periphery of the interface at a target depth position can be acquired without requiring a sectional cutting step. In particular, the interface layer thickness information of a specific interface can be analyzed with high accuracy by grasping the depth (distance) of the target layer through TEM observation.

Figure 2:
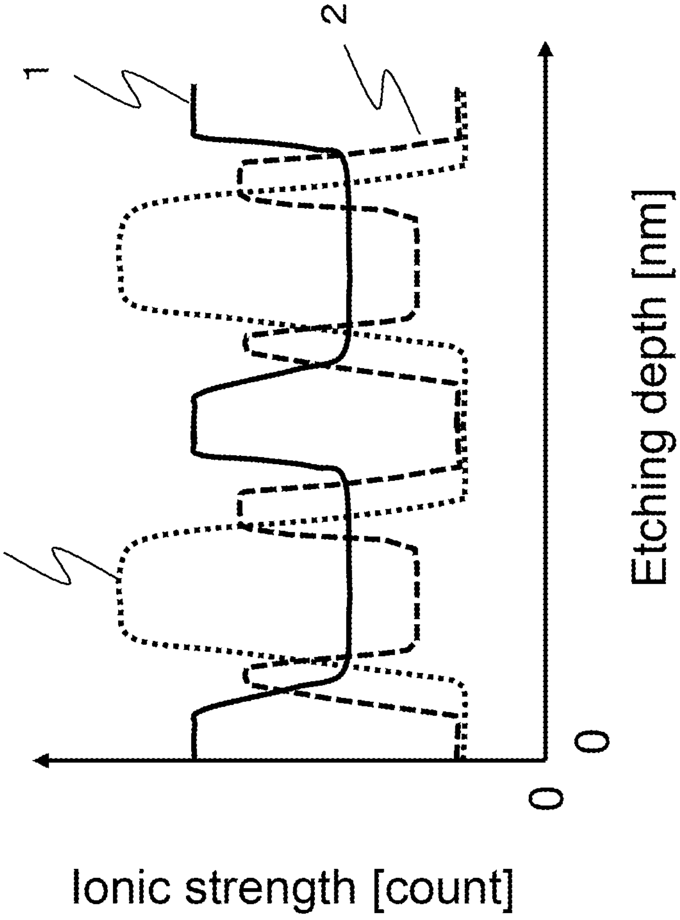
FIG. 2 is a schematic view showing a result of GCIB-TOF-SIMS measurement of a laminated film having a (ABCB)x configuration.

Hereinafter, the results of measuring the laminated film by GCIB-TOF-SIMS will be described with reference to the drawings. FIG. 1 is a schematic view showing the GCIB-TOF-SIMS measurement result of a laminated film having the (AB)x configuration, and FIG. 2 is a schematic view showing the GCIB-TOF-SIMS measurement result of a laminated film having the (ABCB)x configuration. Reference numerals 1 and 2 in FIGS. 1 and 2 represent an ionic strength spectrum of a component contained in the thermoplastic resin constituting the thermoplastic resin layer A and an ionic strength spectrum of a component contained in the thermoplastic resin constituting the thermoplastic resin layer B, respectively, and reference numeral 3 in FIG. 2 represents an ionic strength spectrum of a component contained in the thermoplastic resin constituting the thermoplastic resin layer C. The horizontal axis represents the distance (etching depth) in the depth direction of the laminated film when the measurement start position is 0 [nm], and the vertical axis represents the ionic strength of the secondary ion component obtained by irradiating the ion beam at the depth position. Scanning while irradiating with an ion beam in the depth direction and tracking the amount of secondary ion components unique to each thermoplastic resin layer makes it possible to acquire information on the position in the depth direction (each layer thickness) where each thermoplastic resin layer is present in the laminated film as in the present invention, and focusing a place where the ionic strength rapidly changes makes it possible to continuously acquire periodic information on the interface where adjacent thermoplastic resin components coexist. Further, when the same thermoplastic resin layer is formed of alloy components, the mixing ratio of each thermoplastic resin component and the like are also apparent from the ionic strength ratio.

Figure 3:
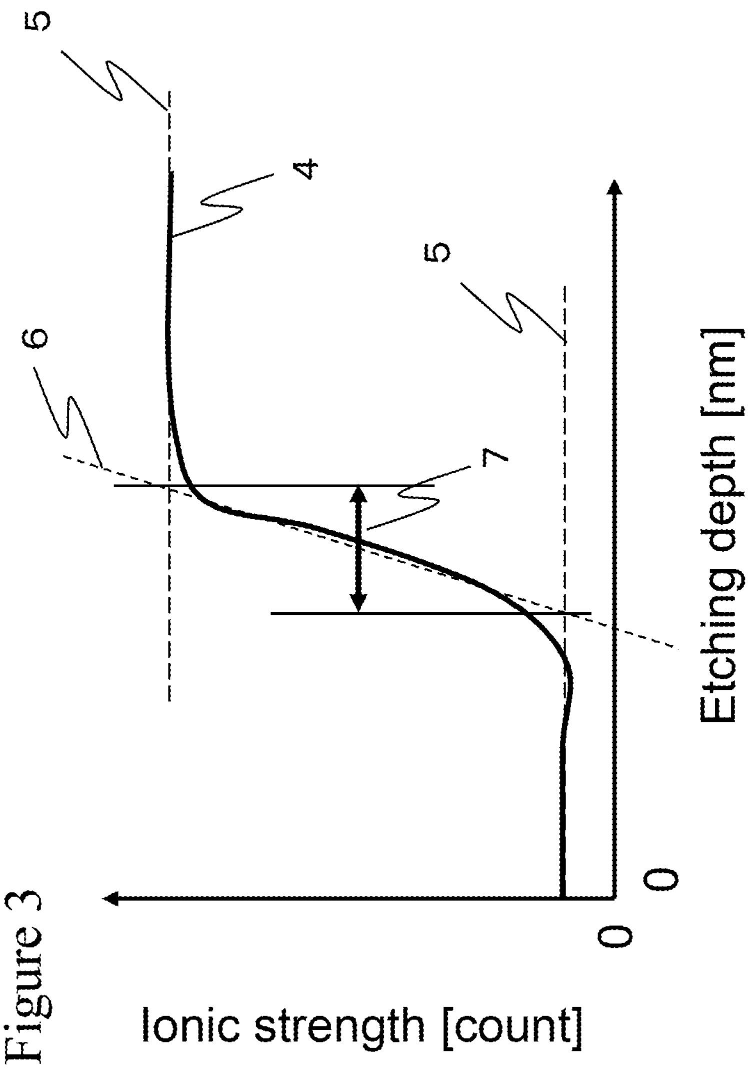
FIG. 3 is a schematic view showing an example of a method for calculating an interface layer thickness according to the present invention.

Next, a specific method of calculating the interface layer thickness will be described below. As an object to be analyzed, two components having high strength is focused among ion components made of a thermoplastic resin which is a main component of each of two different thermoplastic resin layers forming an interface. The intensity distribution of these two components before and after the interface layer is illustrated with the horizontal axis as the etching distance and the vertical axis as the ionic strength (logarithmic representation), and as illustrated in FIG. 3, the horizontal axis (distance, thickness) of the region where the ionic strength continuously changes is read to acquire the interface layer thickness information. Specifically, focusing on a region showing a certain ionic strength corresponding to each thermoplastic resin layer for a specific ionic strength spectrum (reference sign 4), a straight line (reference sign 5) parallel to the horizontal axis representing the same value as the ionic strength value of the region is drawn for each of both thermoplastic resin layers forming the interface to be analyzed. Next, the numerical value of the horizontal axis (etching depth) is read at the intersection of the tangent (reference sign 6) at the inflection point of the steeply changing portion of the ionic strength spectrum and each of the two straight lines (reference sign 5) parallel to the previous horizontal axis, and the difference therebetween is defined as the interface layer thickness (reference sign 7). At least 10 points of the interface formed by the same combination of thermoplastic resins in the laminated film are measured, and the average value thereof is adopted as the interface layer thickness of the interface. The above operation is performed on all the different thermoplastic resin interfaces constituting the laminated film. At this time, when a specific ionic component is focused, due to the measurement, among an interface where the ionic strength rises and an interface where the ionic strength drops, one of them may show a steep slope while the other side shows a gentle slope, although the interface is formed of the same thermoplastic resin. Specifically, in the case of a laminated film having a repeating unit such as (ABCB)x or (ABCDCB)x, such a measurement phenomenon may occur. At this time, when it is clear from the ionic strength information before and after the interface portion that the interface is formed of the same thermoplastic resin, the interface in a direction in which the interface layer thickness is small is adopted to calculate the interface layer thickness.

Figure 4:
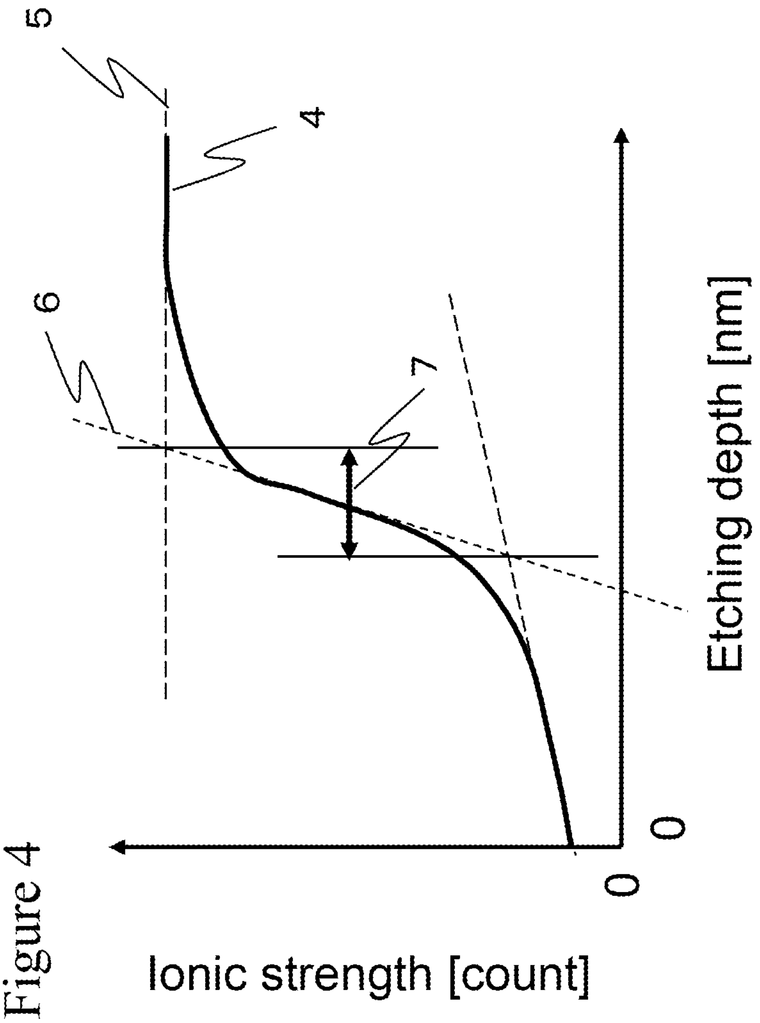
FIG. 4 is a schematic view showing an example of a method for calculating an interface layer thickness according to the present invention.

The position of each thermoplastic resin layer can be roughly determined by combining with TEM section observation. As shown in FIG. 4, when there is a region showing an intensity distribution in which the intensity changes linearly continuously after the intensity changes rapidly, when it can be confirmed from TEM observation or the like that the portion where the intensity changes linearly corresponds to one thermoplastic resin, reference numeral 7 in FIG. 4 is read as the interface layer thickness.

Figure 5:
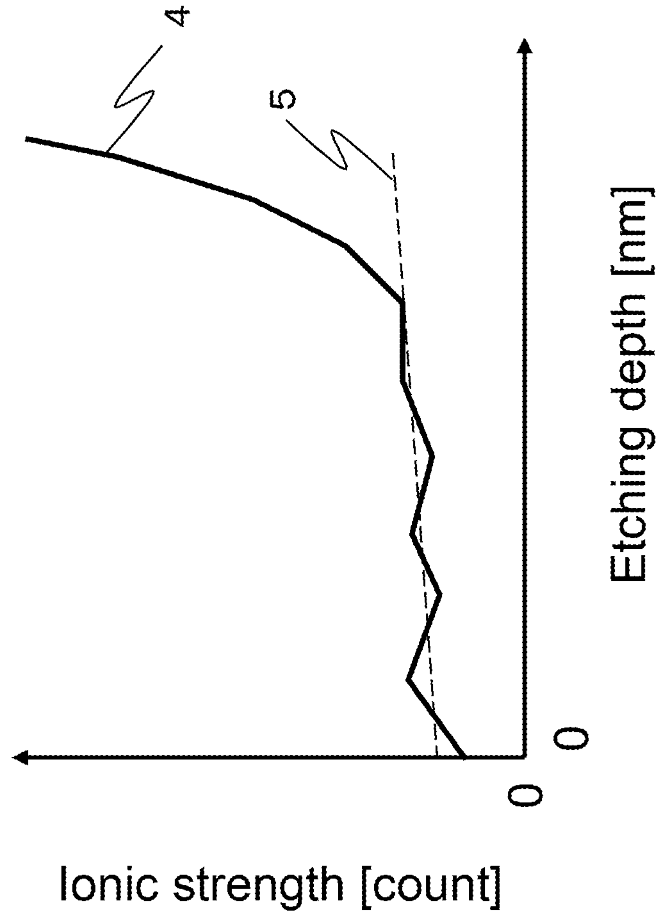
FIG. 5 is a schematic view showing an average line of ionic strength in the method for calculating an interface layer thickness according to the present invention.

The intensity distribution obtained from GCIB-TOF-SIMS does not always show a constant value depending on the measurement resolution particularly in a range showing a constant numerical value corresponding to the inside of each thermoplastic resin layer, and as shown in FIG. 5, the ionic strength spectrum 4 shows a spectrum behavior of continuous bending in many cases. When the strength is substantially constant and it can be determined from the TEM sectional observation image that the region corresponds to the same thermoplastic resin layer, the analysis can be performed using the center line of the intensity distribution as the reference numeral 5.

The interface layer thickness analyzed by GCIB-TOF-SIMS of the present invention specifically has the following two characteristics. First, the interface layer thickness is formed by physical/chemical interaction between thermoplastic resins constituting adjacent thermoplastic resin layers, and the same type of interface repeatedly contained in the laminated film has substantially the same interface layer thickness regardless of the position of the interface contained in the laminated film. Secondly, the interface layer thickness varies depending on before and after stretching the laminated film and stretching conditions, but the interface layer thickness with respect to the total thickness of the resulting laminated film shows substantially the same ratio. This is because the resin at the interface portion is simultaneously and uniformly stretched by co-stretching the laminated film having a plurality of different thermoplastic resins according to the production method described later.

Based on this characteristics, in the laminated film of the present invention, it is important that the laminated film has a lowest value of a ratio of an interface layer thickness to a film thickness of $1.0\times10^{-4}$ or more and $1.0\times10^{-2}$ or less in all types of interfaces formed of the different types of thermoplastic resin layers, the interface layer thickness being analyzed through GCIB-TOF-SIMS. Since lamination disorder and interfacial peeling of the laminated film occur due to the interface having the smallest interface layer thickness, it is necessary to control the layer having the smallest interface layer thickness to a certain or more interface layer thickness.

When the minimum value of the ratio of the interface layer thickness to the thickness of the laminated film is less than $1.0\times10^{-4}$, the interaction and compatibility between the thermoplastic resin layers on both sides adjacent to each other at the layer interface are not sufficiently obtained, and each thermoplastic resin exhibits an independent melt flow at the layer interface at the time of lamination, so that lamination disorder may occur, and the thermoplastic resin layers may not be compatible with each other and delamination may occur even at the thermoplastic resin layer interface after lamination. On the other hand, when the minimum value of the ratio of the interface layer thickness to the thickness of the laminated film is a high value, the interaction between the thermoplastic resin layers at the interface is sufficient, and a sufficient effect is exhibited for lamination disorder and adhesion. When the minimum value of the interface layer thickness exceeds $1.0\times10^{-2}$, an aspect is adopted in which the refractive index continuously changes in the vicinity of the interface layer due to resin diffusion. When such a laminated film is used for optical applications, the interface layer does not function as an interface having a large refractive index difference, and in a spectrum obtained by optical interference reflection based on a product of the refractive index difference and the layer thickness, a shape of a high-order reflection spectrum generated in a band on a shorter wavelength side than a main reflection band changes.

Specifically, since the risk of occurrence of unnecessary high-order reflection in a region closer to the main reflection band is increased, undesirable coloring occurs when the main reflection band is provided on the long-wavelength side of the visible light region such as the near-infrared region as the optical function of the laminated film. In addition, the bandwidth becomes broad in the reflection band generated by the interference reflection, and there is also a problem that the original sharp cutting property of the optical laminated film using the interference reflection is impaired. From the above viewpoint, the lowest value when the ratio of the interface layer thickness analyzed by GCIB-TOF-SIMS to the film thickness is calculated is preferably $5.0\times10^{-4}$ or more and $1.0\times10^{-2}$ or less, more preferably $1.4\times10^{-3}$ or more and $1.0\times10^{-2}$ or less, still more preferably $2.5\times10^{-3}$ or more and $1.0\times10^{-2}$ or less, and particularly preferably $3.0\times10^{-3}$ or more and $1.0\times10^{-2}$ or less.

The lowest value when the ratio of the interface layer thickness analyzed by GCIB-TOF-SIMS to the film thickness is calculated can be controlled within the above preferable range by controlling the thermoplastic resin, the lamination configuration, and the processing process. Hereinafter, preferable conditions under which the interface thickness is in the above-described preferable range, lamination disorder in the lamination step, and adhesion between layers of the laminated film before and after stretching can be enhanced will be described below, but it is not essential to adopt all these conditions at the same time, and these conditions can be adopted alone or in appropriate combination.

Hereinafter, a preferable resin design capable of increasing the interface layer thickness will be described. The thickness can be increased by, for adjacent thermoplastic layers that form an interface, copolymerizing or alloy-kneading a component that forms a skeleton structure contained in a thermoplastic resin forming one thermoplastic resin layer of the adjacent layers with a thermoplastic resin forming the other thermoplastic resin layer of the adjacent thermoplastic resin layers. The amount of the common component to be copolymerized or alloy-kneaded can be achieved by setting the amount of the component having a common chemical structure to 60 mol % or more and 95 mol % or less when the amount of the component constituting the thermoplastic resin is 100 mol % in comparison between the thermoplastic resin layers. The component amount at this time means that, for example, in the case of polyethylene terephthalate, the amount of different components among the thermoplastic resins constituting the adjacent thermoplastic resin layers is 5 mol % or more and 40 mol % or less in total based on the component of the thermoplastic resin constituting the thermoplastic resin layer on one side, considering that the dicarboxylic acid component is 50 mol % and the diol component is 50 mol % in total, that is, 100 mol % in total. When the amount of the common component is less than 60 mol %, molecules of each other hardly form an intermolecular interaction, and compatibility is lowered.

This method is the most simple method, but since components having different basic skeletons coexist in the thermoplastic resin mainly constituting the layer, depending on the dispersion mixed state, components having different basic skeletons exist as sea-island structures (domains) in the thermoplastic resin mainly constituting the layer, and the turbidity (haze) may increase to impair the transparency of the laminated film. The problem of the domain can be solved by increasing the degree of dispersion between the thermoplastic resins, and specifically, the problem can be solved by using a kneading extruder including two or more screws, increasing the ratio of the screw rotation speed to the discharge amount at the time of additive kneading, or changing the arrangement of segments related to screw kneading to a form in which the screws are deeply meshed with each other, and increasing the kneading degree. Alternatively, it is also preferable to contain an additive having a common skeleton that enhances the interaction of the thermoplastic resin.

On the other hand, as another method for increasing the interface layer thickness in the resin design surface, a formulation in which a terminal functional group component that reacts with an unreacted functional group component contained in the thermoplastic resin layer on the other side is contained in the thermoplastic resin layer on the adjacent one side can also be used. Specifically, this is a method in which an unreacted end group contained in a thermoplastic resin that forms a thermoplastic resin layer on one side or an end group contained in an additive added in advance in a layer on one side is reacted with a reactive additive to give a component having the same basic skeleton structure as that of an adjacent thermoplastic resin layer, thereby enhancing the interaction. The functional group for realizing such a reaction can be achieved, for example, by adding an additive containing a terminal group highly reactive with a carboxyl group such as a phenol group, an epoxy group, or an amino group as a reactive additive when the layer on one side contains a carboxyl group terminal, and adding an additive containing an inorganic filler or a metal component as a reactive additive when the layer on one side contains an alkoxysilyl group terminal. In the case of this method, as in the case of copolymerizing, alloying, or blending the thermoplastic resin, in addition to the problem of haze increase due to the dispersion state, the reaction may further proceed when heat is applied to the unreacted additive at the time before the lamination step, and the rheological characteristics may be changed to cause a problem of occurrence of lamination disorder.

Thus, as another aspect, there is a formulation in which the thermoplastic resin layers on one side adjacent to each other contain an unreacted functional group that reacts with an unreacted functional group component contained in the thermoplastic resin layer on the other side. In this method, since the thermoplastic resin supplied from the individual extruder in the laminating step reacts only after coming into contact with the thermoplastic resin during the laminating step in the laminating device, the rheological behavior of the thermoplastic resin constituting each layer is not changed before the laminating step as in the previous method, and occurrence of lamination disturbance is reduced and adhesion can be enhanced, which is preferable. As a combination of functional groups for realizing such a reaction, the above-described combination of functional groups can be used.

Further, as a control factor indicating the interaction between the adjacent thermoplastic resins for increasing the interface layer thickness, it is possible to reduce the difference in the compatibility parameter (SP value) between the thermoplastic resins constituting the adjacent thermoplastic resin layers. The compatibility parameter used herein is a parameter related to energy inherent to the thermoplastic resin, and indicates that the thermoplastic resins having closer numerical values have a similar skeleton structure and are easily mixed at the interface.

In the laminated film of the present invention, the difference in absolute value of the compatibility parameter for forming the interface layer thickness is preferably 1.5 or less in order to set the interface layer thickness to a sufficient thickness that does not cause lamination disorder or peeling. The compatibility parameter can be estimated by a calculation method such as Hansen, Hoy, and Fedors, but the compatibility parameter of the thermoplastic resin, which is an organic polymer material, can be calculated based on the chemical structure of the repeating unit using the Fedors calculation method. By using this method, the compatibility parameter of the thermoplastic resin containing the structural unit derived from the copolymer component can be simply calculated according to the ratio of each structural unit. In the Fedors calculation method, the cohesive energy density and molar molecular volume of molecules depending on the type and number of substituents determine the compatibility parameters, and the compatibility parameter (o) is estimated according to Formula (1). Here, $E_{coh}$ (cal/mol) represents aggregation energy, and V represents molar molecular volume ($cm^3$/mol).

[Mathematical Formula 1]

$$\delta = \sqrt{E_{coh}/V} \quad (1)$$

The compatibility parameter in the laminated sheet of the present invention is a numerical value obtained by rounding off the estimated value calculated based on the Fedor equation to the first decimal place. This method is described in F. Fedors, Polym. Eng. Sci., 14 (2), 147 (1974).

When the thermoplastic resin layer contains a plurality of thermoplastic resins, a value obtained by multiplying the value of the compatibility parameter of each thermoplastic resin alone by the content ratio of the organic polymer material and summing up the values is set as the compatibility parameter of the thermoplastic resin layer. For example, when polyethylene terephthalate (compatibility parameter: 10.7) and polymethyl methacrylate (compatibility parameter: 9.3) are contained at a ratio of 50:50, 10.0, which is an intermediate value between both the compatibility parameters, is the compatibility parameter of the layer.

Next, a preferable lamination configuration capable of increasing the interface layer thickness will be described. As described above, the laminated film of the present invention is required to have two or more different thermoplastic resin layers, but for example, when two thermoplastic resin layers are alternately laminated, it is important that the thermoplastic resins forming the two thermoplastic resin layers contain a large amount of components of a common skeleton structure, and it is very difficult to laminate thermoplastic resins having extremely different skeleton structures without lamination disorder or interfacial peeling. To achieve no lamination disorder and no interfacial peeling while using thermoplastic resins having different skeleton structures, an aspect is preferable in which a third thermoplastic resin layer capable of imparting a buffering function is provided in the middle. For example, a laminated film having a repeating structure of (ABCB)x in the case of a laminated film having three different thermoplastic resin layers, and a laminated film having a repeating structure of (ABCDCB)x in the case of a laminated film formed of four different thermoplastic resin layers is easily achieved. These aspects are preferable because the number of types of interfaces composed of different thermoplastic resin layers constituting the laminated film is small, and the number of elements to be considered such as the types and amounts of common components in resin design is small. When the resin design is applied to and combined with the intermediate thermoplastic resin layer of the laminated film having such a laminated structure, it is easy to realize a laminated film having a large interface layer thickness.

Examples of the lamination process capable of increasing the interface layer thickness include a method of adjusting the temperature in a heat treatment step in a tenter when a stretching step described later is taken as an example. Specifically, when there is only one thermoplastic resin exhibiting a melting point among the thermoplastic resins as the main components of the thermoplastic resin layer constituting the laminated film, it is preferable to perform the heat treatment at a temperature higher than the highest glass transition temperature and lower than the start temperature of the endothermic peak corresponding to the melting point of the thermoplastic resin as the main component of the thermoplastic resin layer corresponding to the outermost layer of the laminated film. When two or more melting points are present, the heat treatment is preferably performed at a temperature equal to or higher than the start temperature of the endothermic peak corresponding to the melting point of the thermoplastic resin having a second highest melting point after the thermoplastic resin as the main component of the thermoplastic resin layer corresponding to the outermost layer among the thermoplastic resins constituting the plurality of thermoplastic resin layers, and lower than the start temperature of the endothermic peak corresponding to the melting point of the thermoplastic resin as the main component of the thermoplastic resin layer corresponding to the outermost layer. The start temperature of the endothermic peak described herein refers to a temperature of a portion corresponding to an intersection of a baseline of an endothermic spectrum obtained by DSC and a tangent at an inflection point on a low temperature side of the endothermic peak.

When a thermoplastic resin exhibiting crystallinity is used as a main component of a plastic resin layer different from the thermoplastic resin layer disposed on the outermost layer in the laminated film by heat treatment in the temperature range, the crystal of the present resin melts to be converted into amorphous molecules, and molecular motion is activated by heat, so that polymers of adjacent thermoplastic resins are diffused with each other at the interface, and molecules are entangled with each other, and compatibility between the two is enhanced. When the layer other than the thermoplastic resin layer corresponding to the outermost surface of the laminated film is an amorphous thermoplastic resin exhibiting no melting point, the heat treatment is preferably performed at a temperature lower than the melting point of the thermoplastic resin forming the outermost thermoplastic resin layer at a temperature as high as possible close to the melting point. The heat treatment temperature of the laminated film can be determined by the microcrystal melting temperature (Tmeta) when the thermal characteristics of the film are heated and measured by a differential scanning calorimeter (DSC) in the measurement method described later.

The method for increasing the interface layer thickness can be achieved by combining a plurality of elements among a resin, a laminated configuration, and process conditions. In view of the above, the laminated film of the present invention preferably has a repeating unit in which three different types of thermoplastic resin layers are arranged in the order of the layer A, the layer B, the layer C, and the layer B. Further, when the thermoplastic resin that is the main component of the layer A is the thermoplastic resin A and the thermoplastic resin that is the main component of the layer C is the thermoplastic resin C, the layer B is preferably based on a thermoplastic resin obtained by blending, copolymerizing, or alloying the thermoplastic resin A and the thermoplastic resin C. By adopting such an aspect, the above-described preferable range of the interface layer thickness can be satisfied.

The phrase "having the blend resin as a main component" as described herein means that the adjacent thermoplastic resin, that is, the thermoplastic resin A and the thermoplastic resin C in this example are blended and supplied at 5:95 to 95:5 (mass ratio) as a production method, and the thermoplastic resin is contained in an amount of more than 50 mass % and 100 mass % or less of the components constituting the layer B. That is, it is synonymous with that the layer B contains the thermoplastic resin A and the thermoplastic resin C in a total amount of more than 50 mass % and 100 mass % or less when the total amount of the layer B is 100 mass %.

When thermoplastic resins having different skeleton structures are blended with each other, it is technically very difficult to maintain the transparency of the laminated film by finely dispersing the thermoplastic resins. Thus, for adjacent thermoplastic resin layers forming an interface, a component forming a skeleton structure contained in a thermoplastic resin forming a thermoplastic resin layer of an adjacent layer is copolymerized or alloy-dispersed and contained with respect to a thermoplastic resin forming a thermoplastic resin layer of one side. Preferable component amounts of the alloy and the copolymerization are as described above.

The laminated film of the present invention preferably has the above-described interface thickness, and has a grid peeling rate of 10% or less in an adhesion test based on a cross-cut method defined in JIS K 5600-5-6:1999. Hereinafter, the "grid peeling rate in adhesion test based on a cross-cut method defined in JIS K 5600-5-6:1999" may be simply referred to as a peeling rate. Peeling of the laminated film is considered to be caused by both aggregation/material fracture in which breakage occurs inside each thermoplastic resin and peeling occurs, and interfacial fracture in which peeling occurs at an interface between thermoplastic resin layers, but peeling due to both can be captured in the cross-cut test. Both fractures are phenomena that should not occur when the laminated film is used for a long time, and the fact that the peeling rate is 10% or less in the cross-cut test indicates that the laminated film has reliability that can withstand long-term use.

When the laminated film exhibits a peeling rate of 10% or less, the occurrence of breakage from the laminated film interface is reduced in long-term use, and for example, in the processing step, lifting due to peeling at the interface during film conveyance in the roll and cracking of a sectional portion in the cutting step are suppressed. As a result, for example, when the protective film is provided at a position different from the laminated film, it is possible to suppress the occurrence of peeling at the laminated film interface due to the peeling strength at the time of peeling. In particular, in applications where a bending step that is repeatedly performed, floating at the interface is less likely to occur, and the original physical properties and optical characteristics of the present laminated film are stably maintained, so that the laminated film is suitable for long-term use. From the above viewpoint, the peeling rate is more preferably 3% or less, and most preferably 0%.

The control of the peeling rate to a preferable range can be achieved by using the above-described achievement methods for increasing the interface layer thickness. In particular, it can be achieved by the fact that three different types of thermoplastic resin layers have, as the structure of the laminated film, a repeating structure of (ABCB)x, and that when a thermoplastic resin as a main component of the layer A is a thermoplastic resin A and a thermoplastic resin as a main component of the layer C is a thermoplastic resin C, the layer B contains a thermoplastic resin obtained by blending, copolymerizing, or alloying the thermoplastic resin A and the thermoplastic resin C as main components. In other words, it can be achieved by setting the total amount of the thermoplastic resins A and C in the layer B to more than 50 mass % and 100 mass % or less, further forming an alloy structure in the layer B while the layer B contains the thermoplastic resins A and C in the above amounts, and the layer B contains more than 50 mass % and 100 mass % or less of a copolymer containing a constituent unit of the thermoplastic resin A and a constituent unit of the thermoplastic resin C. When there is only one thermoplastic resin exhibiting a melting point, it can be achieved by performing heat treatment, as the process condition, at a temperature higher than the glass transition temperature of the thermoplastic resin exhibiting the highest glass transition temperature and lower than the start temperature of the endothermic peak corresponding to the melting point of the thermoplastic resin as the main component of the thermoplastic resin layer corresponding to the outermost layer of the laminated film. When two or more melting points are present, it can be achieved by performing the heat treatment at a temperature equal to or higher than the start temperature of the endothermic peak corresponding to the melting point of the thermoplastic resin having a second highest melting point after the thermoplastic resin as the main component of the thermoplastic resin layer corresponding to the outermost layer among the thermoplastic resins constituting the plurality of thermoplastic resin layers, and lower than the start temperature of the endothermic peak corresponding to the melting point of the thermoplastic resin as the main component of the thermoplastic resin layer corresponding to the outermost layer. By combining all these conditions, the peeling rate can be brought close to 0%.

As described above, when the resin layers constituting the laminated film satisfy the above-described interface thickness and exhibit sufficient adhesion, the laminated film can exhibit a light interference reflection effect obtained by geometrically controlling the refractive index and layer thickness of the thermoplastic resin layer for a long period of time. In particular, in the case of a laminated film having three different thermoplastic resins described as a preferable configuration capable of increasing the interface thickness, by arranging three thermoplastic resin layers having different refractive indexes according to a certain regularity, a wide reflection band and a high reflectance can be realized by an optical design that cannot be achieved in a laminated film in which two thermoplastic resin layers are alternately laminated.

In view of this characteristic, the laminated film of the present invention preferably satisfies $0.060 \leq S/(\lambda \cdot N) \leq 0.300$, where, in an optical spectrum in a wavelength band of 300 nm or more and 2500 nm or less in which a horizontal axis is a wavelength (nm) and a vertical axis is a reflectance (%), a wavelength band continuously showing a reflectance of 20% or more over 100 nm or more positioned in the longest wavelength band is a wavelength band Π1, λ is a center wavelength in the wavelength band Π1, S is a region surrounded by the optical spectrum of the wavelength band Π1 and the baseline of the reflectance, and N is the total lamination number of laminated thermoplastic resin layers of the laminated film. The optical spectrum described herein refers to an optical spectrum obtained by performing ten-point average processing on a reflection optical spectrum obtained by measuring at a pitch of 1 nm using a spectrophotometer in reflectance/reflection optical spectrum measurement described later in Examples. Although details will be described later, reflection spectrum data of 300 nm to 2500 nm can be obtained by acquiring reflectance data of 295 nm to 2505 nm in measurement with a spectrophotometer and averaging data of ten consecutive points.

The reflectance of the wavelength band Π1 (in an optical spectrum in a wavelength band of 300 nm or more and 2500 nm or less where a horizontal axis represents a wavelength (nm) and a vertical axis represents a reflectance (%), a wavelength band continuously showing a reflectance of 20% or more over 100 nm or more located in a longest wavelength band is defined as a wavelength band) of the laminated film of the present invention is usually determined by the difference between the refractive index of the layer having the highest refractive index and the refractive index of the layer having the lowest refractive index among the repeating units. For example, when the repeating unit has three types of thermoplastic resin layers (layer A, layer B, layer C) having different refractive indexes, and the refractive indexes of the layer A, the layer B, and the layer C are high in this order, the difference in refractive index between the layer A and the layer C determines the reflectance of the first-order reflection of the laminated film. Thus, it is important to use a combination of thermoplastic resins that increases the difference in refractive index between the layer A and the layer C, particularly, a combination that increases the difference in refractive index after the stretching step. A thermoplastic resin that can be preferably used as a layer having the highest refractive index and a layer having the lowest refractive index will be described later.

In the laminated film of the present invention, the wide reflection band can be achieved by adopting an aspect in which the layer thickness of the laminated film is continuously inclined according to Formula 2. In addition, the reflection wavelength band can be expanded and the reflectance can be increased by increasing the number of laminated layers, but when the interference reflection characteristic as in the laminated film of the present invention is used, high-order reflection according to Formula 2 may occur in a wavelength band on a shorter wavelength side than first-order reflection corresponding to main reflection. For example, in a (AB)x type laminated film in which two types of layers mainly formed of thermoplastic resins having different refractive indexes are alternately laminated, it is possible to increase or also to suppress the second-order reflection and the third-order reflection corresponding to the reflection bands when the coefficient k of Formula 2 is 2 or 3, by controlling the optical thickness corresponding to the product of the refractive index and the layer thickness. In Formula 2, $n_X$ and $n_Y$ represent the in-plane refractive indexes of the layers forming the alternately laminated structure, and $d_X$ and $d_Y$ represent the thicknesses of the layers forming the alternately laminated structure.

[Mathematical Formula 2]

$$k\lambda = 2(n_X d_X + n_Y d_Y) \quad (2)$$

(where *k* is a natural number.)

Figure 6:
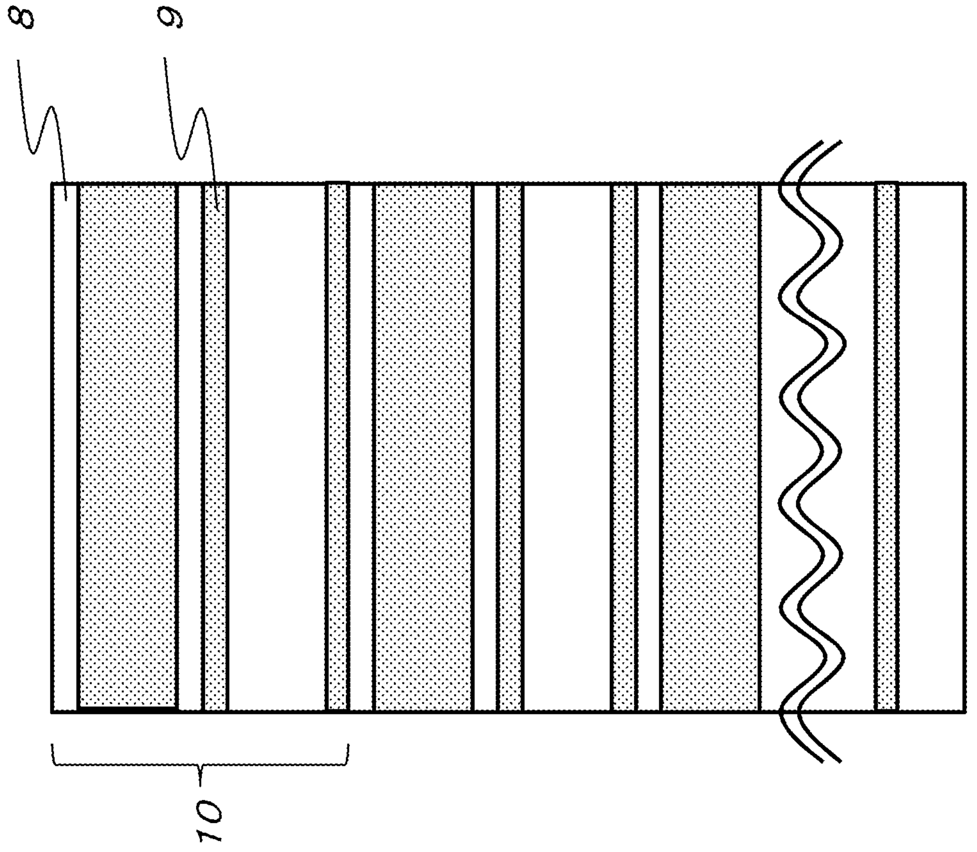
FIG. 6 is an example of a sectional view of a laminated film having a repeating unit of (AB) m of an equivalent film configuration.

For example, when the optical thickness $n_A \times d_A$ of the layer A and the optical thickness $n_B \times d_B$ of the layer B are designed to have ¼ wavelength of a target wavelength band, second-order reflection can be suppressed. Such a design is generally referred to as a λ/4 design. Further, by forming a laminated film having an equivalent film design as shown in the sectional view thereof in FIG. 6, more specifically, a film having a special equivalent film design having a repeating unit of A:B:A:B:A:B=1:7:1:1:7:1, it is possible to simultaneously suppress not only second-order reflection but also third-order reflection (in FIG. 6, reference numeral 8 denotes the layer A, reference numeral 9 denotes the layer B, and reference numeral 10 denotes a repeating unit). However, in the (AB)x type laminated film, it is theoretically impossible to simultaneously suppress the high-order reflection up to the fourth-order reflection when the coefficient k of Formula (2) is set to 4 regardless of the optical thickness design. In other words, to simultaneously suppress high-order reflection up to fourth-order reflection, it is necessary to use three or more types of thermoplastic resin layers having different refractive indexes. Since the occurrence of these high-order reflections tends to cause a decrease in the reflectance of the first-order reflection and a narrowing of the reflection bandwidth, it is preferable to adopt an optical design in which high-order reflections described later do not occur.

For example, a film that reflects heat rays (near infrared rays) is mainly used for preventing a rise in temperature in a room or a vehicle due to near infrared rays from a window. Thus, such a film is required to be highly transparent while reflecting near infrared rays contained in sunlight over as wide a band as possible. However, in the case of a laminated film not designed to suppress high-order reflection but designed so that a wavelength band of 800 nm or more corresponding to near infrared rays becomes the reflection band Π1, there is a case where high-order reflection of a second order or more occurs at a wavelength of 400 to 800 nm corresponding to a visible light band, the laminated film is colored, and transparency is lost.

Thus, to obtain a laminated film capable of reflecting a heat ray in a wide reflection band without causing reflection in the wavelength band of visible light, it is effective to use the λ/4 design or equivalent film design and extend the long-wavelength end of the first-order reflection until the long-wavelength end of generated high-order reflection is 400 nm or less. However, in the laminated film formed of two different thermoplastic resin layers, the order of high-order reflection that can be suppressed is up to the third order, and there is a limit to the range in which the first-order reflection wavelength band can be extended while maintaining transparency. Specifically, since high-order reflection occurs after the fourth order, the upper limit of the long-wavelength end of the wavelength band Π1 corresponding to the main reflection band corresponding to fourfold wavelength is 1600 nm in order to prevent the long-wavelength end of the fourth-order reflection from being included in the visible light region (400 to 800 nm). In this case, since sufficient reflection band and high reflection cannot be obtained, the numerical value of the area S of the wavelength band Π1 cannot be increased, and S/(λ·N), which is an index representing the wide reflection band and high reflection of the laminated film of the present invention, does not satisfy a preferable range.

Thus, when the number of types of thermoplastic resins constituting the repeating unit is three or more, and layers other than layers exhibiting a high refractive index and a low refractive index are designed according to a preferable optical design to be described later, it is possible to simultaneously suppress up to fourth-order reflection. As a result, it is possible to obtain a laminated film having a wide reflection wavelength band while suppressing coloring while extending the first-order reflection band up to 2000 nm.

Hereinafter, a preferable optical design of a laminated film for suppressing high-order reflection will be described by exemplifying a laminated film having three types (refractive indexes) of different thermoplastic resin layers. To suppress high-order reflection in a laminated film formed of layers including three different thermoplastic resins as main components, when the in-plane average refractive indexes of the layer A, the layer B, and the layer C are denoted by $n_A$, $n_B$, and $n_C$ in descending order of refractive index, it is preferable that the ratio $n_A/n_B$, $n_B/n_C$ at each interface other than the layer interface exhibiting the highest refractive index and the layer interface exhibiting the lowest refractive index satisfy the relationship of Formula (3). In the optical theory of interference reflection, the presence or absence of interference reflection affects not only the overlapping of the phases of the light beams reflected at the adjacent interfaces but also the intensity of the light beams reflected at the respective interfaces. Thus, to completely cancel out interference reflection, it is essential to make the intensity of the light beams reflected at the respective resin layer interfaces constant in addition to inverting the phases of the interfering waves. Since the size of the light reflected at the interface affects the ratio of the refractive indexes of the two types of layers constituting the interface, it is preferable to satisfy the above relationship in order to cancel out interference light and suppress high-order reflection.

[Mathematical Formula 3]

$$n_A/n_B = n_B/n_C \tag{3}$$

Hereinafter, a thermoplastic resin that can be preferably used for a thermoplastic resin layer having the highest refractive index and a thermoplastic resin layer having the lowest refractive index will be described. Here, the thermoplastic resin layer having the highest refractive index is described as layer A.

The layer A in the laminated film of the present invention is preferably a layer containing, as a main component, a thermoplastic resin exhibiting a high refractive index even in an unstretched state, particularly a thermoplastic resin exhibiting a refractive index of 1.58 or more. Examples of the thermoplastic resin having a high refractive index of 1.58 or more include polyethylene terephthalate (1.58), polycarbonate (1.59), polyethylene naphthalate glycol (1.60), polystyrene (1.60), polybutylene naphthalate, polyimide (1.61), polydichlorostyrene (1.62), polysulfone (1.63), polyethylene naphthalate (1.64), polyetherimide (1.66), polyetheretherketone (1.73), and polyphenylene sulfide (the refractive index is shown in parentheses). The refractive index as used herein refers to a refractive index measured using an Abbe refractometer at 25° C. with a sodium D ray (wavelength: 589 nm) as a light source and a mount liquid as methylene iodide. At this time, the measurement can be performed after the resin is formed into a sheet by press working or the like.

Of course, these blended products, alloy products, and the like may be used, and the thermoplastic resin may contain a copolymerization component that contributes to improvement of the refractive index and improvement of adhesion between layers with an adjacent resin layer based on the thermoplastic resin. The component (constituent unit) to be contained in the thermoplastic resin for improving the refractive index is preferably a component that contains one or more aromatic rings as a skeleton structure, and has a configuration in which the aromatic rings are linearly arranged when the resin is stretched and oriented in a specific plane direction in the form of a film, thereby improving the refractive index. For example, the thermoplastic resin is most preferably a thermoplastic resin containing components (constituent units) such as terephthalic acid, furandicarboxylic acid, naphthalene dicarboxylic acid, biphenyl dicarboxylic acid, fluorene dicarboxylic acid, anthracene dicarboxylic acid, pyrene tetracarboxylic acid, paraxylene glycol, naphthalene diol, biphenyl diol, fluorene diol, and anthracene diol.

In the laminated film of the present invention, the outermost layers on both sides are preferably the layers A, and the layers A preferably contain a thermoplastic resin exhibiting crystallinity as a main component. When the thermoplastic resin as the main component of the layer A exhibits crystallinity, the above-described aromatic ring components are easily arrayed in the plane direction, and the refractive index of the laminated film after stretching and orientation is greatly improved as compared with that in an unstretched state, so that high reflectance of the laminated film is achieved.

Since both the surface layers are the layer A, only the layer A is in contact with the roll at the time of roll stretching in the production method described later. Thus, to prevent sticking of the film to the roll, only the characteristics of the layer A need to be considered when the roll temperature is adjusted in accordance with the thermal characteristics of the thermoplastic resin layer in contact with the roll. Thus, a laminated film can be obtained in the same film forming step as in the case of forming a single film containing a thermoplastic resin as a main component of the layer A. Further, by the layer A being positioned on the outermost layers on both sides, it is also possible to alleviate a problem that when the thermoplastic resin layer positioned on the outermost layer contains an amorphous resin as a main component, film formation failure or deterioration of a surface state due to sticking of the film to a production facility such as a roll or a clip, and a laminated film having uniform physical properties and optical characteristics in a film plane cannot be obtained because stress does not occur during stretching and uniform stretching cannot be performed.

Whether the thermoplastic resin is a thermoplastic resin exhibiting crystallinity can be determined based on whether the thermoplastic resin has an enthalpy of fusion in differential scanning calorimetry (DSC) measurement (those having an enthalpy of fusion are regarded as having crystallinity). The DSC measurement can be performed in accordance with JIS-K-7122 (1987), and the details thereof will be described later. Among the above-described thermoplastic resins, it is most preferable that the thermoplastic resin is selected from polyethylene terephthalate and polyethylene naphthalate as a crystalline thermoplastic resin that can exhibit a higher in-plane refractive index by stretching and has both high transparency and versatility suitable for optical applications. That is, it is a most preferable aspect that the thermoplastic resin that is the main component of the thermoplastic resin layer (layer A) having the highest refractive index is polyethylene terephthalate or polyethylene naphthalate. Here, the main component refers to a component contained in the layer in an amount of more than 50 mass % and 100 mass % or less.

The thermoplastic resin layer having the lowest refractive index in the laminated film of the present invention (the layer C when there are three types of thermoplastic resin layers) is preferably a layer mainly formed of a thermoplastic resin exhibiting a low refractive index in an unstretched state, particularly a thermoplastic resin exhibiting a refractive index of 1.54 or less. Examples of the resin having a low refractive index as a single thermoplastic resin include an ethylene-propylene fluoride copolymer (1.34), polyvinylidene fluoride (1.42), polybutyl acrylate (1.46), polylactic acid (1.46), polymethylpentene (1.46), polyisobutyl methacrylate (1.48), polymethyl acrylate (1.48), polyethyl methacrylate (1.48), polymethyl methacrylate (1.49), cellulose acetate (1.49), polypropylene (1.50), polybutylene (1.50), polyacrylonitrile (1.51), nylon (1.53), and polyethylene (1.51 to 1.54). The refractive index described herein is a numerical value obtained by analyzing by the B method described in JIS K 7104:2014.

Of course, these blended products, alloy products, and the like may be used, and a copolymerization component that contributes to improvement of the refractive index and improvement of adhesion between layers may be added based on the thermoplastic resin. In addition, a thermoplastic resin based on a thermoplastic resin exceeding 1.54 and containing different components as copolymerization components can also be used as long as the final refractive index of the thermoplastic resin satisfies 1.54 or less. The refractive index of the thermoplastic resin forming the thermoplastic resin layer having the lowest refractive index is preferably 1.51 or less, and more preferably 1.49 or less.

In particular, the thermoplastic resin layer having the lowest refractive index is preferably formed of an amorphous thermoplastic resin whose refractive index does not significantly change after a stretching step. The amorphous resin refers to a thermoplastic resin that does not exhibit an enthalpy of fusion in differential scanning calorimetry (DSC) measurement, and in consideration of transparency, adhesion between layers, film formability, versatility, and the like, acrylic resins such as polybutyl acrylate, polyisobutyl methacrylate, polymethyl acrylate, polyethyl methacrylate, polymethyl methacrylate, and the like among the above are preferably used. Alternatively, to enhance adhesion to the layer A which is a layer having the highest refractive index, it is also preferable to provide a polyester resin having a high refractive index with a copolymerization component to form an amorphous thermoplastic resin having a refractive index of 1.54 or less. For example, in this case, when the total mass of the components constituting the thermoplastic resin is 100 mass %, the amount of the accessory component corresponding to the copolymerization component is preferably 20 mass % or more and 45 mass % or less. More specifically, in the case of a copolymerized polyester resin whose main component is polyethylene terephthalate, it is preferable that a dicarboxylic acid component other than the terephthalic acid component and a diol component other than the ethylene glycol component are contained in a total amount of 20 mass % or more and 45 mass % or less. By controlling the copolymerization amount within this range, the difference in adhesion between layers and thermal fluidic properties of the laminated film is reduced, and thus an amorphous thermoplastic resin having excellent thickness accuracy and thickness uniformity of each layer can be obtained.

Preferable examples of the copolymerization component for decreasing the refractive index include adipic acid, cyclohexanedimethanol, bisphenol A ethylene oxide, spiroglycol, isophthalic acid, isosorbide, cyclohexanedicarboxylic acid, neopentyl glycol, polyethylene glycol 2000, m-polyethylene glycol 1000, m-polyethylene glycol 2000, m-polyethylene glycol 4000, polytetramethylene glycol, m-polypropylene glycol 2000, bisphenylethylene glycol fluorene (BPEF), fumaric acid, and acetoxybenzoic acid. Among them, spiroglycol, neopentyl glycol, a polyethylene glycol component, or the like that exhibits a three-dimensional skeleton structure can be exemplified. Spiroglycol has a small difference in glass transition temperature from polyethylene terephthalate when copolymerized, and thus is less likely to be overstretched during molding, and is less likely to cause delamination. The polyethylene glycol component has an effect of enhancing the hydrophilicity to enhance adhesion between layers, and also effectively lowering the glass transition temperature to enhance the co-stretchability.

The wavelength band Π1 continuously exhibiting a reflectance of 20% or more positioned in the longest wavelength band will be described with reference to FIGS. 7 to 10. In FIGS. 7 to 10, reference numerals 11 to 20 sequentially denotes an optical spectrum, a region area S of the wavelength band Π1, high-order reflection, a center wavelength Λ of the wavelength band Π1, Λmin of the wavelength band Π1, Λmax of the wavelength band Π1, a maximum reflectance of the wavelength band Π1, an intermediate value between the maximum reflectance and the baseline reflectance of the wavelength band Π1, a baseline, and a pulsating flow of the optical spectrum, and an optical spectrum of reference numeral 11 is an optical spectrum obtained by performing ten-point average processing.

Figure 7:
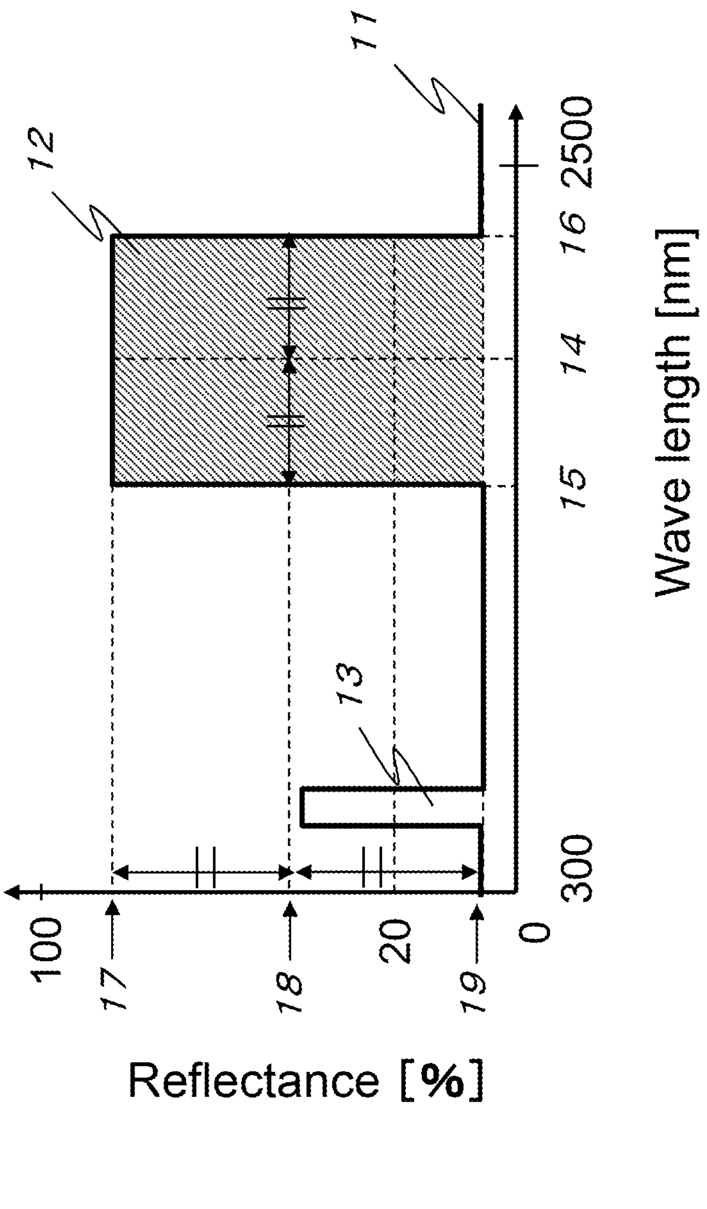
FIG. 7 is a schematic view showing a region area S of a wavelength band Π1, a center wavelength A, and a reflectance baseline in an optical spectrum of the laminated sheet according to one embodiment of the present invention.
Figure 8:
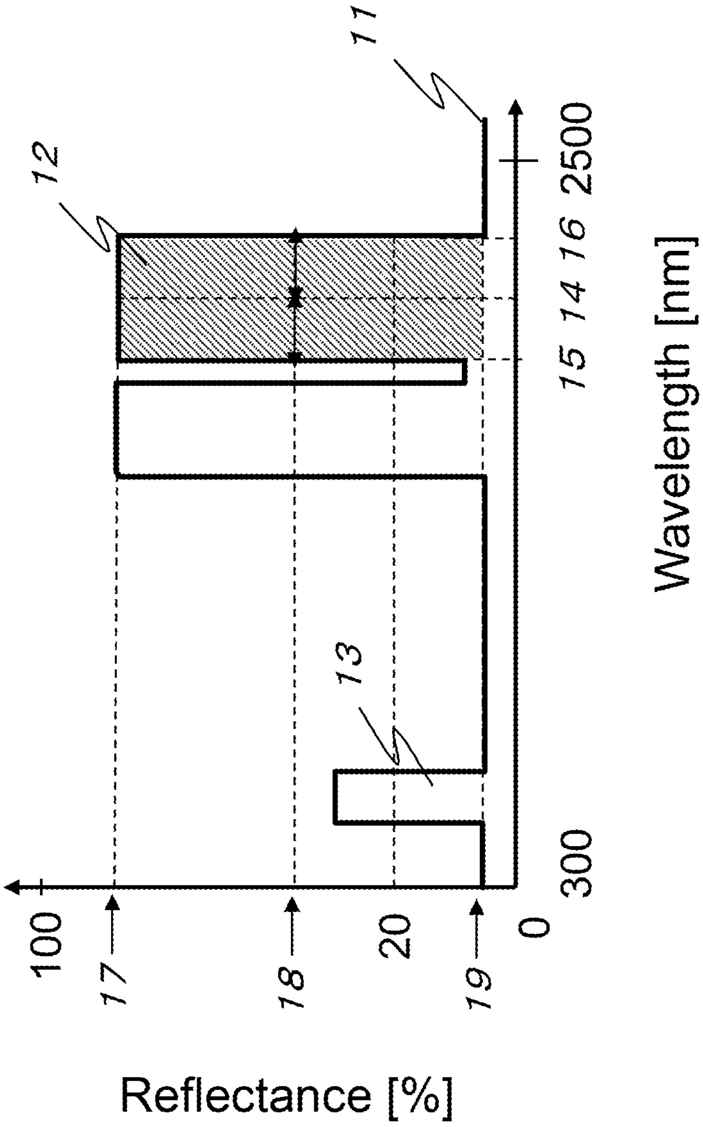
FIG. 8 is a schematic view showing the region area S of the wavelength band Π1, the center wavelength A, and a reflectance baseline in an optical spectrum of the laminated sheet according to one embodiment of the present invention.
Figure 9:
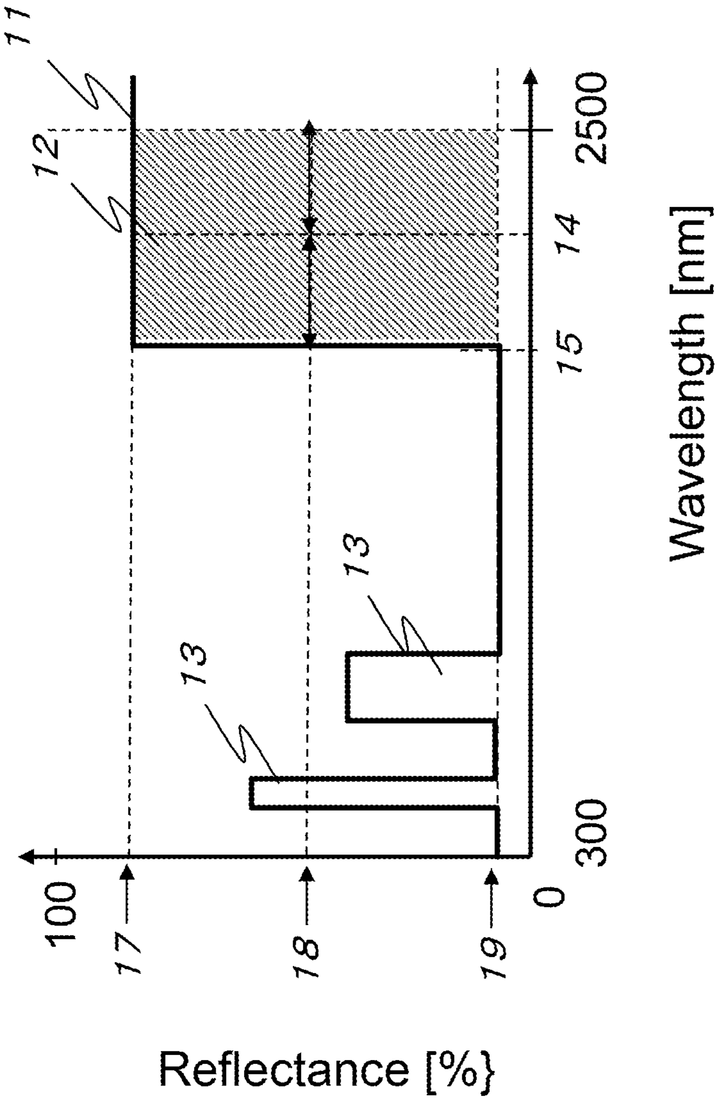
FIG. 9 is a schematic view showing the region area S of the wavelength band Π1, the center wavelength A, and a reflectance baseline in an optical spectrum of the laminated sheet according to one embodiment of the present invention.
Figure 10:
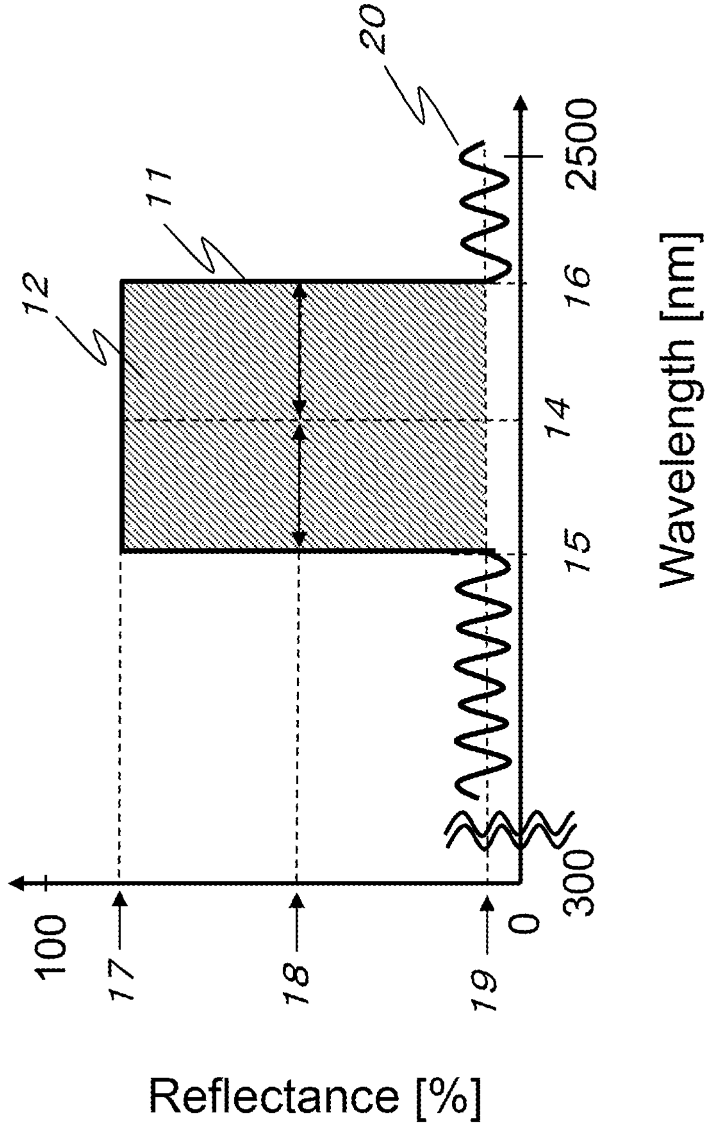
FIG. 10 is a schematic view showing a baseline in an optical spectrum showing a pulsatile reflectance change among the optical spectra of the laminated sheet according to one embodiment of the present invention.

As illustrated in FIG. 7, in the optical spectrum subjected to the average processing, the reflectance wavelength band Π1 refers to a wavelength band positioned on the longest wavelength side among the wavelength bands in which the reflectance is continuously 20% or more over 100 nm or more in the wavelength band of 300 nm or more and 2500 nm or less. As illustrated in FIG. 8, in the reflection wavelength band, when even a part of the region where the reflectance is less than 20% is included, the wavelength band on the long wavelength side where the reflectance is 20% or more is defined as Π1 with the region as a boundary. In addition, as illustrated in FIG. 9, when the wavelength band in which the reflectance is 20% or more over 2500 nm is present on the long wavelength side, the wavelength band is defined as Π1 in a portion included in the wavelength band of 300 nm or more and 2500 nm or less when the reflectance is 20% or more over 100 nm or more.

The area S of the region surrounded by the optical spectrum of the wavelength band Π1 and the baseline of the reflectance indicates the area of the shaded region illustrated in FIGS. 7 to 10. Although the numerical value of the area S of this region substantially represents the performance of wide band and high reflectance of the laminated film, in the case of the laminated film of the present invention, even in the laminated film produced through the same lamination step, the wavelength band shifts according to the thickness of the laminated film, and thus the effect of high reflectance and wide reflection band based on the configuration of the laminated film cannot be expressed only by the area of the region S. Thus, in the present invention, by dividing the area S by the center wavelength λ of the wavelength band, the influence of the wavelength bandwidth change due to the thickness of the laminated film is canceled, and the effect of the high reflectance and wide reflection band based on the configuration of the laminated film is represented.

The center wavelength λ described here is an intermediate wavelength (14 in FIGS. 7 to 9) in the wavelength range of the reflection band Π1 indicating the median value (18 in FIGS. 7 to 9) between the maximum reflectance (17 in FIGS. 7 to 9) of the reflection band Π1 and the baseline. For the area S of the region, for example, a laminated film in which 90% of a band having a wavelength band of 800 nm or more and 1200 nm or less is reflected (the reflectance of the base line is 10%) shows an area S of 32000 of (1200-800) nm×(90-10) % by simple calculation, but when the thickness of the laminated film is half, the wavelength band is 400 nm or more and 600 nm or less. Thus, the value is 16000, which is (600-400) nm×(90-10) %, and the area changes even in the case of a laminated film having the same laminated structure, and the effect of achieving a wide reflection band and high reflectance by the laminated film configuration cannot be exhibited. Thus, when divided by the center wavelength λ of the wavelength band, 1000 nm for the former, and 500 nm for the latter, S/λ=32 is satisfied in both cases, and even in the case of laminated films reflecting different wavelength bands, it is possible to compare the effects of achieving a wide reflection band and high reflectance based on the configuration of the laminated film without depending on the thickness of the laminated film.

Since S/(λ·N) is a numerical value obtained by further dividing the area S/center wavelength λ of the region surrounded by the optical spectrum of the wavelength band Π1 and the baseline of the reflectance by the total lamination number, the fact that S/(λ·N) is 0.060 or more and 0.300 or less indicates that a laminated film having both high reflectance and broadband reflection is obtained while having a small lamination number. In addition, this cannot be often achieved by a conventional technique, particularly a (AB)x type laminated film in which two types of thermoplastic resin layers are alternately laminated.

The fact that S/(λ·N) indicates a numerical value lower than 0.060 means that the lamination number is excessively large, or the inclination of the layer thickness distribution is small and the reflection band is narrow. In the former case, the thickness of the laminated film becomes excessively large, and for example, the optical film for a display may not conform to the recent thinning tendency. Further, when the thickness of the laminated film is excessively large, handleability at the time of post-processing and workability such as sputter deposition is not satisfied in some cases. In addition, in the latter case, since the reflection band of the laminated film is insufficient, the laminated film is not suitable for use in the applications described later in some cases.

On the other hand, when S/(λ·N) indicates a numerical value higher than 0.300, it means that a high reflectance and a wide reflection band are realized with a small lamination number. For this purpose, it is necessary to increase the difference in refractive index between the thermoplastic resin layers, and for this reason, it is essential to laminate thermoplastic resin layers made of thermoplastic resins having completely different skeleton structures, so that there may be a resin combination that does not satisfy the interface thickness range of the present invention. From the above viewpoint, the more preferable range of S/(λ·N) is 0.080 or more and 0.200 or less, still more preferably 0.080 or more and 0.150 or less, and particularly preferably 0.090 or more and 0.130 or less.

Examples of the method for setting S/(λ·N) to a range that satisfies 0.060≤S/(λ·N)≤0.300 or the above-described preferable range include a method in which a laminated film is formed by laminating three types of thermoplastic resin layers in a certain repeating unit, and a thermoplastic resin layer that satisfies the above-described preferable skeleton structure/refractive index condition is combined as a thermoplastic resin layer having the highest refractive index and a thermoplastic resin layer having the lowest refractive index among the three or more types of thermoplastic resin layers, and a method in which the lamination ratio of the three or more types of thermoplastic resin layers is controlled to a range to be described later.

In the laminated film of the present invention, it is preferable that a lamination ratio (A/B) of the layer A to the layer B in the repeating unit is 0.50 or more and 1.30 or less, and a lamination ratio (C/B) of the layer C to the layer B is 0.90 or more and 1.30 or less. By controlling the lamination ratio within the above range, it is possible to obtain a laminated film capable of effectively suppressing high-order reflection even when the laminated film is subjected to variation in lamination ratio conditions due to variation in discharge of an extruder during film formation or variation in refractive index conditions due to variation in process conditions such as a stretching ratio, a stretching temperature, and a heat treatment temperature. In addition, in the laminated film of the present invention, since the thickness of each layer is on the order of nanometers, it is not realistic to accurately control the thickness of each layer constituting all (ABCB) repeating units included in the laminated film as designed depending on the design of the lamination device, and there may be a slight difference in the ratio of the layer thicknesses of a plurality of repeating units included in the laminated film. By controlling A/B and C/B within the above ranges, it is possible to reduce the influence of the variation in the ratio of the layer thickness of the repeating unit and to stably obtain a laminated film in which high-order reflection is suppressed.

In particular, the range of A/B and C/B is a range of a lamination ratio suitable when high-order reflection of second-order reflection and third-order reflection is suppressed. From the above viewpoint, the lamination ratio (A/B) is more preferably 0.80 or more and 1.30 or less, and the lamination ratio (C/B) is 0.90 or more and 1.30 or less. By controlling the lamination ratio of each layer within the preferable lamination ratio range, the average reflectance of the reflection band generated by the high-order reflection of the second-order reflection and the third-order reflection can be suppressed to 20% or less in many cases. To control the lamination ratio within this range, it is effective to manufacture a laminated film formed of three different types of thermoplastic resin layers with a slit-type lamination device capable of realizing high lamination accuracy, and to adjust the discharge amount ratio of the extruder so as to have a target lamination thickness in consideration of the resin density after stretching.

To suppress layer disorder of the laminated film, thick film layers may be provided on both surface layers and inner layers of the laminated film, but in the case of calculating the lamination ratio in the repeating unit of the present invention, the lamination ratio may be greatly different due to the presence of the thick film layer, and thus the thickness of the repeating unit excluding the thick film layer is calculated. Here, the thick film layer refers to a layer having a layer thickness of five times or more the average value of the other layer thicknesses except for the layer.

The laminated film of the present invention preferably has a chroma C* of 10.0 or less in reflection (SCI). The reflection chroma C* of 10.0 or less means that the laminated film is a highly transparent laminated film having no reflection band in the visible light band, or a laminated film exhibiting a colorless metallic tone exhibiting a constant high reflectance over the entire visible light region. Hereinafter, the chroma C* in reflection (SCI) may be referred to as reflection chroma C:. A laminated film exhibiting a reflection chroma C* of 10.0 or less and having a reflection band at any position of 300 to 2500 nm as described above is difficult to achieve by a laminated film having a conventional alternately laminated configuration, and to obtain such a laminated film, it is required to realize a high reflectance/wide reflection band and high transparency due to no high-order reflection.

Specifically, for example, by having a structure in which three different thermoplastic resin layers are laminated with a constant repeating unit and having a layer thickness distribution in which the layer thickness monotonously increases as continuously as possible at constant intervals in the lamination ratio range, the reflection chroma C* can be set to 10.0 or less. This is because when the layer thickness distribution shows an irregular increasing tendency, the reflectance of the reflection band varies, so that an influence on the color tone appears due to reflection omission or strong reflection at a specific wavelength, but this can be suppressed by a monotonic increase. When the reflection chroma C* is small, coloring is not performed due to high transparency or high reflectance. Thus, the chroma C* is more preferably 8.0 or less, and still more preferably 5.0 or less. The lower limit of the chroma C* is theoretically 0.

In the laminated film having a certain repeating unit of the present invention, each thermoplastic resin forming different thermoplastic resin layers constituting the repeating unit can be fed out from different flow paths using the same number or more of extruders as the number of types of the thermoplastic resin, and a laminate can be formed using a multi-manifold type feed block, a static mixer, or the like which is a known laminating device. In particular, in the case of an optical laminated film, the accuracy of individual layer thickness control is very important, and thus, to efficiently obtain the laminated configuration of the present invention with high accuracy, a method using a feed block having a fine slit is preferable. When a laminate is formed using a slit-type feed block, the thickness and distribution of each layer can be achieved by changing the length and width of the slit to incline the pressure loss. Here, the length of the slit is the length of a comb tooth portion forming a flow path for allowing each thermoplastic resin layer to flow in the slit plate so as to form a constant repeating unit.

The laminated film of the present invention is preferably a laminated film having a number of laminated layers of 51 or more and 1001 or less. When two or more types of thermoplastic resin layers have a certain number of repeating units and have the number of laminated layers of 51 or more, the thermoplastic resins can be co-stretched while being mutually supported during stretching and molding, so that a laminated film exhibiting a uniform structure and properties in the film flow direction and width direction can be obtained as compared with a case where the number of laminated layers is small. In addition, in the case of being applied as an optical reflective film, the effect of thin-film interference reflection is exhibited, and characteristics sufficient for practical use as an optical reflective film can be exhibited. Further, to realize high reflectance and reflection band expansion, the number of layers of the laminated film is preferably larger, and is preferably 101 layers or more and 901 layers or less, and more preferably 201 layers or more and 701 layers or less. When the number of laminated layers exceeds 1001, an increase in manufacturing cost due to an increase in size of a manufacturing device, deterioration in handleability due to an increase in film thickness, and the like may occur. From the same viewpoint, it is preferable to continuously have five or more repeating units formed of two or more different types of thermoplastic resin layers.

By continuously having such a repeating unit, when an amorphous thermoplastic resin is used as a thermoplastic resin having different viscosity and viscoelastic characteristics, the thermoplastic resin is easily and uniformly stretched following the stretchability of the crystalline thermoplastic resin repeatedly present in the laminated film, and the lamination uniformity in the plane of the produced film is enhanced. When the laminated film is used for optical applications, interference reflection easily occurs, so that the reflectance of the laminated film can be improved and the reflection wavelength band can be extended, leading to enhancement of optical functions. From the above viewpoint, the number of repeating units continuously included is preferably 10 or more, and more preferably 50 or more. The larger the number of such repeating units is, the more preferable it is from the viewpoint of uniform stretching and optical performance of the laminated film, but it is realistic that the number of such repeating units is 300 or less in consideration of an increase in manufacturing cost due to an increase in size of a manufacturing device, lamination disorder due to an increase in complexity of the lamination step, deterioration in handleability due to an increase in film thickness, and the like.

The laminated film of the present invention can be designed to have a layer thickness distribution in which the layer thickness of each thermoplastic resin layer constituting the laminated film monotonously increases or decreases, a layer thickness distribution in which the layer thickness decreases after the layer thickness increases from one side of the film toward the film center, a layer thickness distribution in which the layer thickness increases after the layer thickness decreases from one side of the film toward the film center, and the like. The inclined form of the layer thickness distribution can be designed to be one that continuously changes such as linear, equal ratio, and gradation sequence, or one in which about 10 to 50 layers have substantially the same layer thickness and the layer thickness changes stepwise.

In particular, to achieve high reflectance, it is preferable that there is no reflectance loss in the wavelength band Π1. The reflectance loss is likely to occur when there is a portion where the lamination ratio relationship of the three types of resins in the repeating unit constituting the layer thickness distribution collapses, and when there is a layer thickness distribution having two or more inclinations such as a layer thickness distribution that decreases after the layer thickness increases from one side of the film toward the center of the film. Thus, the layer thickness distribution of the laminated film of the present invention is preferably a layer thickness distribution that monotonously increases or decreases from one surface side toward the opposite surface of the film.

The reflectance loss also depends on the number of layers of the laminated film and the degree of inclination of the layer thickness in the layer thickness distribution. When the layer thickness distribution has a large layer thickness inclination despite the small lamination number, loss may occur because the reflection band does not exhibit continuity. On the other hand, when the layer thickness inclination is extremely small although the lamination number is small, the reflectance in the reflection band Π1 is saturated at 100%, and the effect of broadband and high reflection suitable for the lamination number is not obtained in some cases. Overall, the inclination of the layer thickness distribution with respect to the number of layers should be controlled within an appropriate range, but as a guide, it is preferable that the inclination degree is designed to be 1 or more and the inclination degree/the number of layers is designed to be in a range of 0.001 or more and 0.0023 or less.

The inclination degree is a numerical value indicated by the inclination when a linear approximation straight line is calculated for a portion showing a monotonous increase in the layer thickness distribution for each thermoplastic resin layer. When a plurality of thermoplastic resin layers have a monotonically increasing layer thickness distribution, the average value of the thermoplastic resin layers is adopted. The number of layers refers to the total number of layers constituting the laminated film. On the other hand, the portion showing the monotonically decreasing layer thickness distribution is, on the contrary, preferably designed in a range in which the inclination degree is 1 or less and the inclination degree/number of layers is –0.0023 or more and –0.001 or less.

In the laminated film of the present invention, the layer thickness of the thermoplastic resin layer situated at the outermost layer is preferably 10 times or more and 100 times or less the average value of the thicknesses of the same thermoplastic resin layer excluding the outermost layer. By increasing the thickness of the thermoplastic resin layer corresponding to the outermost layer, lamination disorder can be further suppressed. Also in the step of stretching the laminated film, the thin film/thermoplastic resin layer inside the laminated film is easily stretched uniformly following the stretching of the thick thermoplastic resin layer positioned at the outermost layer. In particular, regarding the former, the influence of shearing received in the vicinity of the single tube inner wall is one of the factors causing layer disorder inside the laminated film, and the influence of lamination disturbance can be reduced by increasing the thickness of the thermoplastic resin layer of the outermost layer and adopting an aspect in which the interface does not exist within a certain distance from the wall surface. Thus, when the layer thickness of the thermoplastic resin layer positioned at the outermost layer is less than 10 times, an aspect in which many interfaces are present in a region affected by shearing may occur, and lamination disorder in the lamination step may occur, and on the other hand, when the layer thickness is more than 100 times, the thickness of the entire laminated film becomes thick, so that handleability may deteriorate due to thickening during film conveyance after stretching or in a post-processing step. The layer thickness of the thermoplastic resin layer positioned at the outermost layer is preferably in the range of 30 times or more and 80 times or less in view of the influence of shearing and the thickness of the film to be obtained.

In the laminated film of the present invention, the thermoplastic resin layer disposed on the outermost surface of the laminated film preferably has a plane orientation coefficient fn of 0.01 or more and 0.30 or less. The plane orientation coefficient is a parameter indicating an orientation state in a plane direction of the laminated film, and can be expressed according to Formulas (4) and (5). Here, $n_X$ represents the refractive index in the orientation axis direction in the plane of the laminated film, $n_Y$ represents the refractive index in the direction perpendicular to the orientation axis direction in the plane of the film, $n_{XY}$ represents the average refractive index in the plane, and $n_Z$ represents the refractive index in the thickness direction of the film. The plane orientation coefficient fn shows a high value because the laminated film itself has crystallinity, and the polymer is stretched by stretching to be oriented and crystallized. The orientation axis direction of the laminated film is mainly affected by the magnitude of the stretch ratio in the longitudinal direction and the width direction of the film in the biaxial stretching step to be described later, but the stretching direction is not necessarily the orientation direction generally because the film may exhibit complicated behavior due to the shrinkage process of the film in the heat treatment/cooling step and the like. Thus, in the present invention, the orientation direction is determined based on the numerical value of the orientation angle obtained by the phase difference measuring device KOBRA series capable of measuring the orientation direction by an optical method manufactured by Oji Scientific Instruments Co., Ltd. A direction indicated by the numerical value of the orientation angle is defined as an X-axis direction, and a direction perpendicular to the orientation direction is defined as a Y-axis direction.

[Mathematical Formula 4]

$$fn = n_{XY} - n_Z \tag{4}$$

[Mathematical Formula 5]

$$n_{XY} = (n_X + n_Y)/2 \tag{5}$$

As described above, the laminated film of the present invention can be crystal-melted at a heat treatment temperature in the stretching process to enhance the diffusion effect of adjacent thermoplastic resins, but when the plane orientation coefficient fn is 0.01 or more, the crystal component of the stretched film does not completely melt, and tension at the time of film conveyance is maintained in the step of producing the laminated film. As a result, the film is less likely to be affected by film flutter due to hot air during heat treatment or accompanying airflow during conveyance in the heat treatment step, so that stretching unevenness of the laminated film is reduced, and the risk of breakage due to melting of a part of the laminated film is also reduced. On the other hand, when the plane orientation coefficient is 0.30 or less, the inhibition of the interface diffusion due to the presence of the crystal component after the heat treatment process hardly occurs, so that the effect of increasing the interface layer thickness is easily obtained. Thus, the plane orientation coefficient of the laminated film is preferably controlled to 0.01 or more and 0.30 or less, more preferably 0.10 or more and 0.25 or less, and still more preferably 0.15 or more and 0.25 or less.

The laminated film of the present invention can be preferably used as an optical film for shielding or collecting and utilizing by utilizing a light interference reflection technique at an interface. In an optical multilayer film utilizing a light interference reflection technique at an interface, reflection characteristics thereof change depending on a difference in refractive index between thermoplastic resin layers constituting the laminated film, but in the laminated film of the present invention in which thermoplastic resin layers having different skeleton structures can be laminated while having adhesion, and it is possible to provide a laminated film exhibiting an original function over a long period of time while enhancing an optical function as compared with a conventional technique in which peeling occurs and lamination cannot be performed unless a resin having the same skeleton structure is used and a difference in refractive index (optical performance) of a certain level or more is not provided.

As the laminated film using the light interference reflection technology, for example, it can be used as a window film in applications of automobiles and building fittings, a decorative film that develops a metallic tone for exterior and interior in home electric appliances, electronic devices and automobiles, a film for laminating a steel sheet on a signboard or the like in industrial material applications, a light beam cut film for laser surface processing, an optical film for various image display devices such as a process/release film of a photolithographic material, a smartphone, a head-up display, an electronic paper, a digital signage, and an AR/VR display in electronic device applications, and other film applications for the purpose of suppressing photodegradation in the fields of food, medicine, ink, and the like.

As a use method, it can be used by post-bonding to a product, or in-mold molding or insert molding as a molded body. That is, the molded body of the present invention is formed by using the laminated film of the present invention.

Hereinafter, an image display device, a window, a transport facility exterior member, and a transport facility according to the present invention will be described.

The laminated film or molded body of the present invention can be preferably used particularly as an optical film for an image display device. In other words, the image display device of the present invention uses the laminated film of the present invention or the molded body of the present invention. As the image display device, various devices such as a liquid crystal image display device, an organic EL display device, a quantum dot display, and a micro LED display are used, and films exhibiting various functions are disposed inside various displays. For example, in the case of a liquid crystal image display device, examples of the films include a polarizer protective film and a retardation film that constitute a polarizing plate, a surface treatment film that is bonded to a display front surface to add a function, a luminance enhancement film disposed immediately above a light guide plate of a backlight, a specular reflection film used for a back surface of a backlight light-guide plate, a transparent conductive substrate film used for ITO and the like, and an ultraviolet protective film of a touch sensor member. In particular, since the laminated film of the present invention is characterized by exhibiting high reflectance, in the case of a liquid crystal display device, the laminated film can be preferably used as a regular reflection film used for the back surface of a backlight light-guiding plate or a screen protection film for post-bonding for the purpose of improving luminance and protecting contents from heat rays and ultraviolet rays from the outside. In the case of an organic EL image display device, examples thereof include a λ/4 phase difference film and a polarizer protective film constituting a circularly polarizing plate disposed on the viewing side (upper side) of the light emitting layer, a surface-treated film for imparting a function by being bonded to the front surface of a display, and various optical films incorporated for the purpose of protecting contents from external light. In particular, in the organic EL image display device, the laminated film of the present invention can be preferably used as a polarizer protective film or various optical films for the purpose of protecting contents from external ultraviolet rays or the like.

The window of the present invention is formed by using the laminated film of the present invention or the molded body of the present invention. For example, when the laminated film of the present invention having a reflection band in a near-infrared region is used for a window, it is possible to realize reduction in indoor temperature rise, improvement in cooling efficiency, energy saving, improvement in fuel efficiency of a vehicle, and the like. More preferably, the laminated film is a laminated film in which a part of high-order reflection occurs in an ultraviolet region, or both near infrared rays and ultraviolet rays can be shielded by containing an ultraviolet absorber or the like in the laminated film. The window including such a laminated film can effectively reduce a skin tingling feeling caused by solar radiation, sunburn caused by ultraviolet rays, and the like, in addition to the indoor temperature rise reduction. In addition, the laminated film and the molded body of the present invention are not limited in color or tone of transparent glass and the like, and those having performance of reflecting and shielding a specific wavelength band can be appropriately used in applications where specific light is desired to be shielded.

In particular, a vehicle window such as an automobile is strongly required to have high transparency in its standard. Thus, the laminated film of the present invention can be preferably used in that high transparency can be realized as compared with the current window material of the heat ray absorption type that somewhat shields visible light due to the absorption characteristics of the heat ray absorber. In vehicle applications, in window materials such as a front window, a door window, a side window, a delta window, a rear window, and a sunroof, the laminated film of the present invention may be used as a laminated glass interlayer film material, and the laminated film can be attached to the surface of each of the windows as an after part. In addition, examples of a window material including the molded body of the present invention include a window material using a high-strength resin such as polycarbonate as a substitute for glass, in accordance with weight reduction and a wide variety of designability in recent years. Such a window material can also be obtained by integral molding together with the laminated film of the present invention.

The laminated film of the present invention can also be used as a window film for preventing indoor temperature rise as a building material fitting application. Also in the case of a window for building material fittings, examples of a material to which the laminated film of the present invention can be combined include materials such as glass and resin as in a vehicle window for automobiles and the like.

The transportation facility exterior member of the present invention is formed by using the laminated film of the present invention or the molded body of the present invention. The transportation facility refers to a power engine or the like having a moving and transporting means such as a vehicle, an aircraft, a ship, or an unmanned aerial vehicle, and the transportation facility exterior member refers to a member that can be used for an exterior of the transportation means (even a member that can be used for an interior and also can be used for an exterior included in the member that can be used for an exterior). Specific examples of the transport facility exterior member include an emblem, a front grille, and a bumper.

Examples of the use of the laminated film or the molded body of the present invention for a transport facility exterior member include an aspect in which the laminated film of the present invention is attached to an automobile exterior member such as an emblem, a front grille, or a bumper, and an aspect in which a molded body obtained by integrally molding the laminated film of the present invention and a high-strength resin such as polycarbonate is used. A metal material has been conventionally used for the automobile exterior members described above, but with the spread of automated driving technology using a millimeter wave radar or light detection and ranging (LIDAR), and the like, there is a problem that a collision prevention effect or the like that should be originally provided by recognizing an obstacle or a front vehicle cannot be obtained due to a radar reflection loss in the metal material used for the vehicle exterior. To solve such a problem, replacement with a nonmetallic material exhibiting a metallic tone is expected in the automobile exterior material described above, and the laminated film and the molded body of the present invention can be preferably used for such applications.

Further, as a preferable aspect of the present invention, transportation such as a power engine having a moving and transporting means such as a vehicle, an aircraft, a ship, and an unmanned aerial vehicle can be exemplified. In other words, the transportation system of the present invention includes the laminated film of the present invention, the molded body of the present invention, the window of the present invention, or the transport facility exterior member of the present invention. Examples thereof include an example in which the laminated film of the present invention is used as a window material or a material of an emblem, a front grille, a bumper, or the like in order to prevent a temperature rise in a vehicle. For example, as the laminated film of the present invention that can be suitably used for the heat shielding window material, it is preferable to design the wavelength band Π1 in the near-infrared region to suppress high-order reflection generated in the visible light region.

Next, other applications of the laminate and the molded body of the present invention will be described. In applications of automobiles, home electric appliances, and electronic devices, metallic-tone optical performance can be imparted to a molded body by performing insert molding or in-mold molding, but in a conventional laminated film, when the thickness of the laminated film is changed due to local elongation by molding, there is a problem that the wavelength band is shifted due to thinning and the metallic tone is impaired. When the laminated film of the present invention is a wide-band reflectable laminated film having a reflection band not only in a visible light region but also in a long wavelength region, it is easy to maintain a metallic tone even after the laminated film is stretched by molding. In addition, examples in which a metallic-tone visible light reflecting film or a molded body including the same is used as a decorative application (garnish material) for automobile interiors can also be mentioned, and at this time, by setting the wavelength band Π1 of the laminated film of the present invention to the entire visible light range, a metallic-tone film having a lower number of lamination and a thin film and having better adhesion than conventional ones can be obtained.

Next, a preferred method for producing the laminated film of the present invention will be described below. Of course, the present invention should not be construed as being limited to such an example.

The thermoplastic resin constituting each layer of the laminated film is prepared in the form of pellets or the like. The pellets are dried in hot air or under vacuum as necessary, and then fed to separate extruders. When an additive is contained in the thermoplastic resin, powder, granule, and liquid additives may be kneaded and dispersed in the process of the main extrusion, or master pellets in which the additive is dispersed in the thermoplastic resin in advance may be supplied. Each of the thermoplastic resins melted in the extruder by heating to a temperature equal to or higher than the melting point is made uniform as to the extrusion amount by a gear pump or the like, and is freed of any foreign matters or denatured resin through a filter or the like. These thermoplastic resins are discharged in a sheet form from a die after a desired laminate is formed through a laminating device. Then, the sheet discharged from the die is extruded onto a cooling body such as a casting drum and cooled and solidified to obtain a cast sheet. In this process, it is preferable to bring the sheet into close contact with the cooling body such as a casting drum by an electrostatic force using a wire-like, tape-like, needle-like, or knife-like electrode, and to rapidly cool and solidify the sheet. It is also preferable to employ a method of bringing the sheet into close contact with the cooling body such as a casting drum by blowing air from a slit-like, spot-like, or planar device, and rapidly cooling and solidifying the sheet, or bringing the sheet into close contact with the cooling body using a nip roll, and rapidly cooling and solidifying the sheet. A liquid having good wettability such as liquid surfactant water or liquid paraffin can be supplementarily applied to the surface of the casting drum to impart adhesion.

The plurality of types of thermoplastic resins constituting the laminated film are sent out from different flow paths by using extruders of the number equal to or larger than the number of types of thermoplastic resin layers, and sent to the multilayer lamination device before being discharged in a sheet shape. Examples of usable multilayer laminating device include a multi-manifold die, a feed block, and a static mixer. In particular, in order to efficiently obtain the multilayer lamination structure, a feed block having fine slits is preferably used. Since the device is not extremely large, use of such a feed block produces less generation amount of foreign matters by thermal deterioration, and enables highly precise lamination even when an extremely large number of layers are laminated. Moreover, the precision of lamination in the width direction is also significantly improved as compared with conventional techniques. In this device, since the thickness of each layer can be adjusted by the shape of the slit (length, width), any layer thickness can be achieved. The molten multilayer laminated sheet thus formed into a desired layer configuration is guided to a die, and a cast sheet is obtained as described above.

The flow path sectional shape of the single tube for guiding the laminate to the die preferably has a high aspect ratio in which the ratio of the length of the flow path in the width direction to the thickness of the flow path is 5 or more. When the laminate flows in the single pipe, a flow velocity difference is generally generated between the vicinity of the single pipe wall surface and the central portion of the single pipe due to the influence of shear applied to the single pipe wall surface. In particular, at the end in the width direction of the single pipe, the influence of the flow velocity difference due to the wall surface in the width direction of the single pipe is also added, and thus a complicated spiral resin flow is generated and lamination disorder occurs. When a single pipe having a small aspect ratio of the flow path section is used, the influence of the disorder of the resin flow at the position of the single pipe in the width direction also affects the vicinity of the center in the width direction, and thus a laminated film having a larger lamination disorder in the film width direction is obtained. Further, in the case of forming a laminate with three or more types of thermoplastic resin layers as in the present invention, the viscoelastic behavior is often different for each thermoplastic resin constituting the layer, and when a single tube having a flow path section with a low aspect ratio in which a difference in resin flow velocity is likely to occur is used, lamination unevenness in the width direction may become more remarkable together with a change in viscoelastic behavior. For this reason, to obtain a laminated film with less lamination unevenness in the film width direction, the flow path sectional shape of the single tube preferably exhibits as high an aspect ratio as possible, more preferably 10 or more, and still more preferably 20 or more. When the aspect ratio of the section of the single pipe flow path is extremely high, the length of the flow path in the width direction may become very long, leading to an increase in the size of the device in the film width direction, or the thickness of the flow path may become very thin, leading to a problem that the film is strongly affected by the flow velocity difference not only at the position of the single pipe in the width direction but also at the wall surface of the single pipe, leading to an increase in the disorder of the lamination thickness in the thickness direction in the entire film. Thus, it is realistic to set the upper limit of the aspect ratio to 100 or less.

The obtained cast sheet is preferably, subsequently biaxially stretched in the longitudinal direction and the width direction. The stretching may be sequentially biaxially stretched or simultaneously biaxially stretched. Further, the cast film may be re-stretched in the longitudinal direction and/or the width direction. Here, the longitudinal direction (also referred to as a flow direction) refers to a running direction of the film, and the width direction refers to a direction orthogonal to the longitudinal direction in the film plane.

First, the case of sequential biaxial stretching will be described. Here, the stretching in the longitudinal direction refers to uniaxial stretching for imparting molecular orientation in the longitudinal direction to the sheet, and the stretching is usually performed by a circumferential speed difference of rolls, and may be performed in one step or in multiple steps using a plurality of roll pairs. The stretch ratio varies depending on the type of the resin, but is usually preferably 2 to 15 times, and for example, when polyethylene terephthalate or polyethylene naphthalate, which is a general-purpose crystalline thermoplastic resin preferably used for the laminated film of the present invention, is used, 2 to 7 times is particularly preferably used. The stretching temperature is preferably set within the range from the glass transition temperature to the glass transition temperature+100° C. of the resin having the highest glass transition temperature among the resins constituting the laminated film. When the film is strongly oriented in the stretching step in the longitudinal direction, neck-down in the film width direction occurs, and thus a sufficient film width cannot be obtained, and thickness unevenness and transmission spectrum unevenness in the longitudinal direction and/or the width direction after stretching in the width direction may increase.

The uniaxially-stretched laminated sheet thus obtained is subjected to a surface treatment such as a corona treatment, a frame treatment, or a plasma treatment as necessary, and then an easily adhesive layer having functions such as slipperiness, adhesiveness, and antistatic properties is applied by in-line coating. In the in-line coating step, the easily adhesive layer may be applied to one surface of the laminated film, or may be applied simultaneously or sequentially to both surfaces of the laminated film.

Subsequently, the uniaxially-stretched laminated sheet is stretched in the width direction. The stretching in the width direction refers to stretching for imparting orientation in the width direction to the sheet, and is usually performed by conveying the sheet while holding both ends in the width direction with clips using a tenter. The stretch ratio varies depending on the type of the resin, but is usually preferably 2 to 15 times, and for example, when polyethylene terephthalate or polyethylene naphthalate, which is a crystalline thermoplastic resin preferably used for the laminated film of the present invention, is used, 2 to 7 times is particularly preferably used. The stretching temperature is preferably from the glass transition temperature to the glass transition temperature+120° C. of the resin having the highest glass transition temperature among the resins constituting the laminated film.

The laminated film thus biaxially stretched is heat-treated in a tenter at a temperature equal to or higher than the stretching temperature and equal to or lower than the melting point of the resin having the highest melting point among the resins constituting the laminated film, uniformly cooled slowly, and then cooled to room temperature and wound up. In addition, as necessary, a relaxation treatment or the like may be performed together in the longitudinal direction and/or the width direction at the time of slow cooling from the heat treatment in order to impart thermal dimensional stability.

Subsequently, the case of simultaneous biaxial stretching will be described. In the case of simultaneous biaxial stretching, the obtained cast sheet is subjected to a surface treatment such as a corona treatment, a flame treatment, or a plasma treatment as necessary, and then functions such as slipperiness, easy adhesiveness, and antistatic properties may be imparted to the film by in-line coating. In the in-line coating step, the easily adhesive layer may be applied to one surface of the laminated unit, or may be applied simultaneously or sequentially to both surfaces of the laminated film.

Then, the cast sheet is led to a simultaneous biaxial tenter, conveyed with both end portions in the width direction of the sheet being held with clips, and stretched in the longitudinal direction and the width direction simultaneously and/or in stages. Examples of a simultaneous biaxial stretching machine include those of a pantograph type, a screw type, a drive motor type, and a linear motor type. A simultaneous biaxial stretching machine of a drive motor type or a linear motor type is preferable because the machine is capable of changing the draw ratio arbitrarily and capable of performing the relaxation treatment at any place. The stretch ratio varies depending on the type of the resin, but the area ratio is usually preferably 6 to 50, and when polyethylene terephthalate or polyethylene naphthalate, which is a crystalline thermoplastic resin preferably used for the laminated film of the present invention, is used, the area ratio is particularly preferably 8 to 30. The stretching speed may be the same speed, or the film may be stretched in the longitudinal direction and the width direction at different speeds. The stretching temperature is preferably from the glass transition temperature to the glass transition temperature+120° C. of the resin having the highest glass transition temperature among the resins constituting the laminated film.

To impart planarity and dimensional stability to the sheet simultaneously and biaxially stretched in this way, it is preferable to subsequently perform heat treatment at a stretching temperature or higher in the tenter at a temperature equal to or lower than the highest melting point of the thermoplastic resin that is the main component of the thermoplastic resin layer constituting the laminated film. In the heat treatment, it is preferable to perform a relaxation treatment in the longitudinal direction instantaneously immediately before and/or immediately after the film enters the heat treatment zone in order to reduce the distribution of the main orientation axis in the width direction. After being heat-treated in this manner, the film is gradually cooled down uniformly, and then cooled to room temperature and wound up. A relaxation treatment in the longitudinal direction and/or the width direction may be performed as necessary during the gradual cooling from the heat treatment. In addition, a relaxation treatment may be instantaneously performed in the longitudinal direction immediately before and/or immediately after the sheet enters the heat treatment zone.

The laminated film obtained as described above is trimmed to a necessary width through a winding device, and wound in a roll state so as not to cause winding wrinkles. At the time of winding the film, both ends of the film may be embossed to improve the winding shape.

The thickness of the laminated film of the present invention is not particularly limited, but is preferably 5 μm or more and 100 μm or less. The thickness is preferably 80 μm or less, more preferably 50 μm or less in consideration of the tendency of various functional films to be thinned. Although there is no lower limit, it is practically preferable that the thickness is 10 μm or more in order to stabilize the roll windability and form a film without breakage.

The method for adjusting the thickness of the laminated film is not particularly limited, but since it is preferable to adjust the thickness without changing the stretch ratios in the conveyance direction and the width direction, it is preferable to adjust the thickness by increasing or decreasing the take-up speed of the cooling body such as the casting drum. To suppress film width shrinkage occurring at this time, it is preferable to appropriately adjust a gap between the die and the cooling body. When the film width cannot be made constant, for example, the stretch ratio in the width direction can be made constant by adjusting the distance between clips in the tenter.

A hard coat layer including a curable resin as a main component may be laminated on the outermost surface of the laminated film of the present invention to add functions such as scratch resistance, dimensional stability, adhesiveness and adhesion. When the laminated film is conveyed by roll-to-roll for mounting on a product, scratches due to rubbing between the roll and the film can be prevented from occurring on the surface of the laminated film. Further, even when the resin oligomer component in the laminated film or various additives that can be added to the laminated film may bleed out in the high temperature heat treatment, the hard coat layer having a high crosslinking density can exhibit the precipitation suppressing effect by providing the hard coat layer on the outermost surface. In addition, by laminating the curable resin layer, a dimensional change of the film due to heat treatment can be suppressed, and an increase in film thickness due to thermal shrinkage and a change in optical characteristics such as a transmission spectrum of the laminated film associated therewith can be suppressed.

In addition to the hard coat layer, an abrasion resistant layer, an antireflection layer, a color correction layer, an ultraviolet absorbing layer, a tacky layer, a gas barrier layer to which a metal oxide or the like is added, a printing layer, or the like may be formed as a layer exhibiting functionality. These layers may be a single layer or a multilayer, and one layer may have a plurality of functions.

EXAMPLES

The present invention will now be described by way of examples thereof; however, the present invention is not restricted thereto. Each characteristic was measured by the following method.

(Method for Measuring Properties and Method for Evaluating Effects)

Methods for measuring properties and methods for evaluating effects in the present invention are as follows.

(1) Differential Scanning Calorimetry (DSC)

A differential scanning calorimeter EXSTAR DSC 6220 manufactured by Hitachi High-Technologies Corporation was used. Measurement and temperature reading were performed according to JIS-K-7122 (1987). A microcrystal melting temperature Tmeta (° C.) showing a minute endothermic peak different from a melting point at a temperature higher than a glass transition temperature Tg (° C.) at an intersection point between a baseline and a tangent at an inflection point of a step transition portion when a temperature of about 5 mg of a sample was raised from 25° C. to 300° C. at a rate of 10° C./min on an aluminum receiving pan, a melting point Tm (° C.) corresponding to a peak top of an endothermic peak (melting point) confirmed on the highest temperature side when the sample was rapidly cooled with liquid nitrogen after the temperature was raised and further raised under the same conditions, a melting enthalpy ΔHm (J/g) corresponding to an area, and a start temperature (° C.) of an endothermic peak at an intersection point between a baseline of the endothermic peak and a tangent at an inflection point on the low temperature side among the peak inflection points were read.

(2) Layer Configuration

The layer thickness distribution of the laminated film was determined by transmission electron microscope (TEM) observation of a sample sliced using an ultramicrotome. Specifically, using a transmission electron microscope JEM-1400 Plus (manufactured by JEOL Ltd.), a section of the laminated film was observed under the condition of an acceleration voltage of 100 kV, and a sectional image was acquired to measure the layer configuration (number of lamination, repeating unit, and layer thickness distribution) and the thickness of each layer. To obtain a large contrast difference between the layers, a dyeing technique using an electron dye ($RuO_4$ or the like) was used. In accordance with the thickness of each layer, observation was performed at a direct magnification of 40,000 when the thin film layer thickness was less than 100 nm, at a direct magnification of 20,000 when the thin film layer thickness was 100 nm or more and less than 500 nm, and at a magnification of 1000 to 10,000 depending on the thickness when the thin film layer thickness was 500 nm or more, and the layer thickness distribution was analyzed. The lamination number, the repeating unit, the layer thickness of each layer, and the lamination ratio were determined based on the contrast difference of the obtained image. The lamination ratio was calculated from the ratio of the total thickness of the layer A and the layer C to the total thickness of the thermoplastic resin layer, the layer B, by focusing on the repeating unit of the portion excluding the outermost layer.

(3) Layer Interface (Contrast Difference)

The sectional image obtained by transmission electron microscope observation (2) was converted into a compressed image file (JPEG) format, and position-luminance data was acquired through a line profile along the thickness direction of the laminated film using ImagePro-10 (distributor: Hakuto Co., Ltd.). Thereafter, a five-point moving average process was performed on the profile obtained by plotting the relationship between the position and the luminance using spreadsheet software "Excel®" 2016. In the averaging processing, luminance averaging processing was performed on five consecutive measurement positions, and similar calculation was performed by changing the position one by one and performing continuous processing, thereby acquiring a position-luminance profile subjected to the averaging processing. In the obtained average-processed position-luminance profile, a position surrounded by an inflection point at which the inclination changes from positive to negative or from negative to positive was determined as one layer. For each layer obtained by this method, subsequently, position-luminance data was acquired with respect to a planar direction (direction perpendicular to a thickness direction) of the laminated film. After calculating the average value and the standard deviation of the luminance obtained for each layer, it was determined that adjacent two layers were different when the difference between the average values of the luminance of the adjacent two layers was larger than any of the standard deviations of the luminance of the adjacent thermoplastic resin layers. In addition, the difference (distance) in position between the inflection points was calculated as the layer thickness of each layer.

(4) Reflectance and Reflection Optical Spectrum Measurement

A sample was cut out in a 4 cm square from the center in a width direction of the laminated film, and one surface of the laminated film was subjected to a back surface blackening treatment using a black lacquer spray. In the back surface blackening treatment, overcoating was performed three times to completely block light. Using a spectrophotometer U-4100 manufactured by Hitachi High-Tech Science Corporation, the untreated side of the sample subjected to the back surface blackening treatment was fixed to the opening on the back surface of the integrating sphere toward the light source side, and the reflection optical spectrum at normal incidence was measured. In the measurement, background correction was performed with an aluminum oxide standard white plate (attached to a main body) attached to an integrating sphere attached to the device, a slit was set to 2 nm (visible)/automatic control (infrared), an infrared-visible light source switching wavelength was set to 850 nm, a gain was set to 2, a scan speed was set to 600 nm/min, a sampling pitch was set to 1 nm, and a reflection optical spectrum in a wavelength region of 295 nm or more and 2505 nm or less was continuously measured.

(5) Average Processing of Reflection Spectroscopic Spectrum and Calculation of S and Λ

An average value of transmittance data at ten points before and after the optical spectrum data at a pitch of 1 nm obtained in the reflectance measurement in (4) was calculated. (For example, for data of 295 nm to 304 nm, transmittance average value data of 299.5 nm is calculated. The measurement was performed up to 2505 nm, and data of 1 nm pitch from 299.5 nm to 2500.5 nm was calculated.) Thereafter, an average value of two adjacent points was sequentially calculated (for example, average transmittance data at 300 nm was calculated from the average of 299.5 nm and 300.5 nm), and the same calculation was repeated to obtain ten-point average reflection optical spectrum data with wavelengths of 300 nm to 2500 nm. The data was graphed so that the horizontal axis represents the wavelength nm and the vertical axis represents the reflectance %, and the area S and the center wavelength λ were obtained.

(6) Measurement of Interface Layer Thickness (GCIB-TOF-SIMS)

The interface layer thickness was measured using TOF. SIMS5 manufactured by ION-TOF. The surface layer of the sample to be measured was cut by a desired thickness to obtain an interface to be measured. Thereafter, the surface of the cut sample placed in a high vacuum environment of 4.0×10-7 Pa or less was repeatedly irradiated with an argon gas cluster beam (etching ions) at an acceleration voltage of 20 kV and a pulse wave of Bi3 ions (pulse width 10.9 ns), and the emitted positive secondary ions were guided to a time-of-flight mass spectrometer, and the intensities of components having different masses were analyzed. Focusing on two components having high strength among secondary ion components independently contained in different thermoplastic resin layers, a spectrum with a measurement depth (distance) on the horizontal axis and absolute ionic strength (number of ion component counts and logarithmic display) on the vertical axis is illustrated for each component, and then focusing on a rising portion of each component at an interface portion, a numerical difference of an etching depth corresponding to reference numeral 7 in FIGS. 3 and 4 is read as an interface layer thickness of the interface. The measurement depth was converted from the depth of a crater formed by ion etching on the assumption that the etching rate of each layer was constant. The measurement of the interface layer thickness was performed at any 15 points focusing on the interface of the same type of thermoplastic resin layer, and the average value of the thicknesses of the interface layers of the two components (30 points in total) was defined as the final interface layer thickness.

(7) Crosscut Peeling Rate

Evaluation was performed according to an adhesion (cross-cut) test method specified in JIS K 5600 May 6 (1999). Using a cross cut guide CCJ-1 with an interval of 1 mm manufactured by COTEC, 11 vertical and horizontal orthogonal cuts were made at an angle of 20 to 30° with an NT cutter to create a 100 square grid. "Cellotape®" manufactured by NICHIBAN Co., Ltd. having a width of 24 mm was stuck to the grids, the tape was quickly peeled off at an angle of about 60°, and the number of completely peeled grids was read. This operation was repeated 10 times, and the average value of the number of peeled grids was obtained to calculate the peeling rate.

(8) Orientation Axis Measurement

A sample was cut out in a 4 cm square from the center in the width direction of the laminated film, and the sample was placed on a retardation measuring device (KOBRA-WPR) manufactured by Oji Scientific Instruments Co., Ltd. so that the film width direction was at an angle of 0° as defined by the present measuring device, and the orientation angle at an incident angle of 0° was measured in an in-plane retardation measurement mode with a high retardation, and read.

(9) Plane Orientation Coefficient fn

To calculate the plane orientation coefficient, the refractive index was measured using a prism coupler (SPA-4000) manufactured by Sairon Technology, Inc. A film sample cut out in a size of 3.5 cm×3.5 cm from the center in the film width direction was placed on a device, irradiated with a laser of 632.8 nm, and measured in the TE mode to measure the in-plane refractive index of the thermoplastic resin layer as the outermost layer in the TM mode, thereby measuring the in-plane refractive index of the same layer. Specifically, in the TE mode, the refractive index $n_X$ in an X-axis direction was measured by setting the orientation axis (X-axis direction) of the film parallel to the device, and the refractive index $n_Y$ in the direction perpendicular to the orientation axis was measured by setting the X-axis direction of the film perpendicular to the device. In addition, an average value of refractive indexes obtained when the orientation axis direction of the film was measured in a direction parallel and perpendicular to the device in the TM mode was defined as a perpendicular direction refractive index $n_Z$. Using these numerical values, the plane orientation coefficient fn was calculated according to Formulas (4) and (5).

[Mathematical Formula 6]

$$fn = n_{XY} - n_Z \quad (4)$$

[Mathematical Formula 7]

$$n_{XY} = (n_X + n_Y)/2 \quad (5)$$

(10) Reflective Color Tone C* Measurement

A sample was cut out in a size of 10 cm×10 cm from the center in the film width direction, and the chroma C* of the reflected color tone of the laminated film was measured using a spectrophotometer CM3600d manufactured by Konica Minolta Sensing, Inc. Specifically, an MVD attachment having a measurement diameter of 8 mm was attached, 0% calibration was performed using an attached 0 configuration box, and 100% calibration was performed using an attached white calibration plate, and then the chroma C* value in the SCI mode when the light source was the C light source was read. Measurements were randomly made at five points in a 10 cm square laminated sample surface, and the average value was taken as the measured value.

(11) Appearance (Flow Mark)

A laminated film sample cut into a 20 cm square was sandwiched between two linear polarizing plates orthogonal to each other, and the laminated film sample was placed so that the flow direction or the width direction of the laminated film was 45° with respect to the transmission axis of the linear polarizing plate. A set body of the linearly polarizing plate and the laminated film was disposed immediately above the backlight with the diffusion film interposed therebetween, and a flow mark visually recognized in an arcuate (parabolic) shape was visually confirmed from immediately above. The quality of appearance was determined according to the following criteria.

A: No flow mark was observed.

B: One to two arcuate parabolas of the flow marks were visually observed in the range.

C: Three to five arcuate parabolas of the flow marks were visually observed in the range.

D: Six or more arcuate parabolas of the flow marks were visually observed in the range.

<Thermoplastic Resin>

The thermoplastic resin and additives used in Examples of the present invention will be described below. The copolymerization component amount of the polyester resin described herein represents the copolymerization amount with respect to 100 mol % of the acid component and 100% of the diol component. A thermoplastic resin having no description of a melting point or a glass transition temperature is a thermoplastic resin having no melting point or glass transition temperature within a measurement temperature range.

Resin 1: Polyethylene terephthalate resin obtained by copolymerizing 10 mol % of isophthalic acid, exhibiting a glass transition temperature of 79° C. and a melting point of 230° C.

Resin 2: Polyethylene terephthalate resin obtained by copolymerizing 16 mol % of isophthalic acid, exhibiting a glass transition temperature of 78° C. and a melting point of 217° C.

Resin 3: Homo-polyethylene naphthalate resin exhibiting a glass transition temperature of 125° C. and a melting point of 264° C.

Resin 4: Polyethylene naphthalate resin obtained by copolymerizing 5 mol % of polyethylene glycol having a molecular weight of 400, exhibiting a glass transition temperature of 100° C. and a melting point of 254° C.

Resin 5: Polycyclohexanedimethylene terephthalate resin obtained by copolymerizing 10 mol % isophthalic acid, exhibiting a glass transition temperature of 80° C.

Resin 6: Poly 1,4-cyclohexanedimethylene terephthalate resin obtained by copolymerizing 33 mol % of ethylene glycol, exhibiting a glass transition temperature of 81° C.

Resin 7: Polyethylene terephthalate resin obtained by copolymerizing 33 mol % of cyclohexane dimethanol, exhibiting a glass transition temperature of 80° C.

Resin 8: Homo-polymethylene methacrylate resin exhibiting a glass transition temperature of 103° C.

Resin 9: A resin obtained by subjecting a resin 4 and a resin 8 to nanoalloy kneading at a volume concentration ratio of 50:50, exhibiting a glass transition temperature of 101° C.

Resin 10: Polymethaxylenediamine adipamide resin exhibiting a glass transition temperature of 86° C. and a melting point of 237° C.

Resin 11: Polyethylene naphthalate obtained by copolymerizing 40 mol % of terephthalic acid, exhibiting a glass transition temperature of 107° C. and a melting point of 195° C.

<Additive>

Acrylic polymer exhibiting an epoxy value of 1.4 meq/g with an average molecular weight of 2900 g/mol <Water-Based Coating Agent:

Silica colloidal particles having a particle size of 100 nm were added to a material obtained by mixing the following polyester resin 1 (100 parts by mass), reactive compound 1 (30 parts by mass), and reactive compound 2 (30 parts by mass) in an amount of 0.5 parts by mass with respect to 100 parts by mass of the binder resin, the concentration was adjusted with water as a solvent, and then 0.03 parts by mass of a surfactant was added with respect to 100 parts by mass of the total of water and mixed to obtain a coating composition.

Polyester Resin 1:

An aqueous dispersion of a polyester resin formed of the following copolymerization composition was obtained. The following copolymerization component and 0.1 parts by mass of potassium titanium oxalate as a catalyst were added to the reactor, and the temperature was raised to 200° C. while they were stirred and mixed at normal pressure in a nitrogen atmosphere. Subsequently, the reaction temperature was gradually raised to 250° C. over 4 hours to complete the transesterification reaction. The polyester resin in an amount of 15 parts by mass and 85 parts by mass of water were added to a dissolution tank and dispersed at a temperature of 80 to 95° C. over 2 hours under stirring to obtain a 15% aqueous dispersion of the polyester resin.

(Copolymerization Composition)

Dicarboxylic Acid Component

Dimethyl 2,6-naphthalenedicarboxylate: 88 mol %

Dimethyl sodium 5-sulfoisophthalate: 12 mol %

Diol Component

Compound obtained by adding 2 mol of ethylene oxide to 1 mol of bisphenol S: 86 mol %

1,3-propanediol: 14 mol %

Reactive Compound 1:

Carbodiimide water-based crosslinking agent ("CARBODILITE®" V-04 manufactured by Nisshinbo Chemical Inc.)

Reactive Compound 2:

Oxazoline-containing polymer water-based dispersion ("EPOCROS®" WS-500 manufactured by NIPPON SHOKUBAI CO., LTD.)

Example 1

As the respective thermoplastic resins constituting the thermoplastic resin layer A and the thermoplastic resin layer B, the resin 1 and the resin 5 were sequentially used. The prepared thermoplastic resins were separately charged into two twin screw extruders in pellet form, melted at 270° C. and 280° C., and kneaded, respectively. The kneading conditions were all set so that the screw rotation speed with respect to the discharge amount was 0.7. Subsequently, seven disks of FSS type leaf disc filters were interposed, and then the FSS type leaf disc filters were metered by a gear pump and joined by a feed block having 11 slits whose temperature was adjusted to 280° C., so that a 11 layered laminate was formed such that the layer A/layer B had a lamination ratio of 1.0, the layers were alternately laminated in the thickness direction, in which both surface layers were the layer A. Here, the slit length and width in the feed block were designed to be constant over the entire layer. Thereafter, the laminate passed through the feed block was supplied to a T-die and formed into a sheet, and then rapidly cooled and solidified on a casting drum having a surface temperature maintained at 25° C. while an electrostatic application voltage of 8 kV was applied with a wire to obtain an unstretched laminated cast sheet. The obtained laminated cast sheet was heated with a group of rolls set at 85° C., and then stretched 3.0 times in the longitudinal direction while being rapidly heated from both surfaces of the film by a radiation heater within a stretching section length of 100 mm, and then once cooled. Subsequently, both surfaces of the obtained laminated uniaxially stretched film were subjected to corona discharge treatment in air, the wet tension of the base film was set to 55 mN/m, and the treated surfaces of both surfaces of the film were coated with an aqueous coating agent X to be an easily slipping layer (hereinafter, performing coating means the above procedure) with a #4 metabar to form a transparent, easily slipping and easily adhesive layer. Further, the uniaxially laminated film was guided to a tenter, preheated with hot air at 80° C., and then stretched 3.0 times in the film width direction at a temperature of 85° C. The biaxially stretched film was heat-fixed with hot air at 90° C. immediately after lateral stretching, subjected to a 3% relaxation treatment in the width direction immediately before the outlet of the tenter, and then wound up. The evaluation results of the obtained laminated film are shown in Table 1.

Examples 2 to 6, Example 13

A laminated film was obtained in the same manner as in Example 1 except that the resin of each layer, the number of laminated feed blocks (the number of repeating units), the inclined structure, the distribution inclination degree, and the film formation conditions were changed as shown in Tables 1 and 2. The evaluation results are shown in Tables 1 and 2.

Comparative Example 1

A laminated film was obtained in the same manner as in Example 1 except that the resin species and the extrusion temperature of the thermoplastic resin B layer were changed as shown in Table 1. The evaluation results of the obtained laminated film are shown in Table 1.

Comparative Example 2

A laminated film was obtained in the same manner as in Example 5 except that the resin species, the surface layer thickness, the extrusion temperature, the stretching temperature, the stretching ratio, and the heat treatment temperature of the thermoplastic resin layer A and the thermoplastic resin layer B were changed as shown in Table 1. The evaluation results of the obtained laminated film are shown in Table 1.

Examples 7 to 12, 14 to 18, 23 to 32, Comparative Example 3

As the thermoplastic resins constituting the thermoplastic resins A, B, and C, those shown in Tables 1, 2, and 3 were used. The prepared thermoplastic resins in the form of pellets were separately charged into three twin screw extruders, respectively, melted at temperatures shown in Tables 1, 2, and 3, and kneaded. A laminated film was obtained by the same production method as in Example 1 except that the film configuration and the film formation conditions were as shown in Tables 1, 2, and 3. Specifically, the film thickness was adjusted by adjusting the cast drum take-up speed, and the outermost layer thickness of the laminated film was adjusted by changing the slit thickness of the portion corresponding to the outermost layer of the laminating device. The evaluation results are shown in Tables 1, 2, and 3.

Examples 19 to 22

An epoxy end modifier for improving adhesion was compounded in advance in a thermoplastic resin described in Table 2 at a predetermined addition concentration, and the obtained product was used as a thermoplastic resin constituting a thermoplastic resin layer. Further, a laminated film was obtained in the same manner as in Example 14 except that the heat treatment temperature was changed as shown in Table 2. The evaluation results of the obtained laminated films are shown in Table 2.

TABLE 1

| | | | | Example 1 | Example 2 | Example 3 | Example 4 | Example 5 | Example 6 | Example 7 | Example 8 |
|---|---|---|---|---|---|---|---|---|---|---|---|
| Laminated film | Resin | Layer A | — | Resin 1 | Resin 1 | Resin 1 | Resin 1 | Resin 1 | Resin 1 | Resin 1 | Resin 1 |
| | | Layer B | — | Resin 5 | Resin 5 | Resin 6 | Resin 7 | Resin 6 | Resin 6 | Resin 7 | Resin 7 |
| | | Layer C | — | — | — | — | — | — | — | Resin 6 | Resin 6 |
| | Additive | Additive layer | Layer | — | — | — | — | — | — | — | — |
| | | Additive concentration | — | — | — | — | — | — | — | — | — |

TABLE 1-continued

| | | | | | | | | | | | |
|---|---|---|---|---|---|---|---|---|---|---|---|
| | Film configuration | Number of lamination | Layer | 11 | 51 | 51 | 51 | 101 | 301 | 301 | 301 |
| | | Repeating unit | — | AB | AB | AB | AB | AB | AB | ABC | ABCB |
| | | Number of units | Number | 5 | 25 | 25 | 25 | 50 | 150 | 101 | 75 |
| | | Type of outermost layer | Layer | A | A | A | A | A | A | A | A |
| | | Outermost layer thickness | Times | 1 | 1 | 1 | 1 | 1 | 1 | 1 | 1 |
| | | Inclined structure | — | Monotonic increase | Monotonic increase | Monotonic increase | Monotonic increase | Monotonic increase | Monotonic increase | Monotonic increase | Monotonic increase |
| | | Distribution gradient | — | 2.0 | 2.0 | 1.3 | 2.0 | 1.3 | 1.3 | 1.3 | 1.3 |
| | | Film thickness | μm | 25 | 25 | 25 | 25 | 25 | 25 | 25 | 25 |
| | Lamination ratio in repeating unit | Layer A/layer B | — | 0.99 | 0.99 | 0.96 | 0.97 | 0.96 | 0.96 | 0.97 | 0.97 |
| | | Layer C/Layer B | — | — | — | — | — | — | — | 1.02 | 1.02 |
| | Difference in compatibility parameters | | $(cal/cm^3)^{1/2}$ | 1.2 | 1.2 | 0.9 | 0.4 | 0.9 | 0.9 | 0.9 | 0.5 |
| Film formation conditions | Extrusion temperature | Layer A | ° C. | 270 | 270 | 270 | 270 | 270 | 270 | 270 | 270 |
| | | Layer B | ° C. | 280 | 280 | 290 | 290 | 290 | 290 | 290 | 290 |
| | | Layer C | ° C. | — | — | — | — | — | — | 290 | 290 |
| | | Feed block | ° C. | 280 | 280 | 280 | 280 | 280 | 280 | 280 | 280 |
| | Stretching ratio (length/width) | | Times/Times | 3.0/3.0 | 3.0/3.0 | 3.0/3.0 | 3.0/3.0 | 3.0/3.0 | 3.0/3.0 | 3.0/3.0 | 3.0/3.0 |
| | Longitudinal stretching temperature | | ° C. | 85 | 85 | 85 | 85 | 85 | 85 | 85 | 85 |
| | Transverse stretching temperature | | ° C. | 85 | 85 | 85 | 85 | 85 | 85 | 85 | 85 |
| | Heat treatment temperature | | ° C. | 90 | 90 | 90 | 90 | 90 | 90 | 90 | 90 |
| Evaluation results | Interface thickness | Interface showing lowest numerical value | — | A-B | A-B | A-B | A-B | A-B | A-B | A-C | B-C |
| | | Interface thickness/Film thickness | — | 1.0E−04 | 1.0E−04 | 2.0E−04 | 6.0E−04 | 2.0E−04 | 2.0E−04 | 2.0E−04 | 5.0E−04 |
| | Adhesion | Cross-cut/Peeling rate | % | 94 | 85 | 62 | 19 | 65 | 68 | 64 | 39 |
| | Orientation | Plane orientation coefficient fn | — | 0.12 | 0.12 | 0.12 | 0.12 | 0.12 | 0.12 | 0.12 | 0.12 |
| | Spectral characteristics (Band II1) | λ | nm | — | — | 2285 | — | 1550 | 550 | 765 | 1050 |
| | | λmax | nm | — | — | 2385 | — | 1700 | 620 | 880 | 1250 |
| | | λmin | nm | — | — | 2185 | — | 1400 | 480 | 650 | 850 |
| | | Baseline reflectance | % | 6 | 6 | 5 | 5 | 5 | 5 | 5 | 5 |
| | | S/ (λ · N) | % | — | — | 0.051 | — | 0.057 | 0.057 | 0.039 | 0.057 |
| | Reflection chroma C* | | — | 1.4 | 1.5 | 8.8 | 7.6 | 36.6 | 76.5 | 47.1 | 26.2 |
| | Appearance (flow mark) | | — | B | C | B | A | C | C | C | C |

| | | | | Example 9 | Example 10 | Example 11 | Example 12 | Comparative Example 1 | Comparative Example 2 |
|---|---|---|---|---|---|---|---|---|---|
| Laminated film | Resin | Layer A | — | Resin 1 | Resin 1 | Resin 1 | Resin 1 | Resin 1 | Resin 3 |
| | | Layer B | — | Resin 7 | Resin 7 | Resin 7 | Resin 7 | Resin 10 | Resin 8 |
| | | Layer C | — | Resin 6 | Resin 6 | Resin 6 | Resin 6 | — | — |
| | Additive | Additive layer | Layer | — | — | — | — | — | — |
| | | Additive concentration | — | — | — | — | — | — | — |
| | Film configuration | Number of lamination | Layer | 301 | 301 | 301 | 301 | 11 | 101 |
| | | Repeating unit | — | ABCB | ABCB | ABCB | ABCB | AB | AB |
| | | Number of units | Number | 75 | 75 | 75 | 75 | 5 | 50 |
| | | Type of outermost layer | Layer | A | A | A | A | A | A |
| | | Outermost layer thickness | Times | 1 | 10 | 50 | 80 | 1 | 1 |
| | | Inclined structure | — | Monotonic increase | Monotonic increase | Monotonic increase | Monotonic increase | Monotonic increase | Monotonic increase |
| | | Distribution gradient | — | 1.3 | 1.3 | 1.3 | 1.3 | 2.0 | 1.3 |
| | | Film thickness | μm | 27 | 27 | 33 | 35 | 25 | 25 |
| | Lamination ratio in repeating unit | Layer A/layer B | — | 0.97 | 0.97 | 0.97 | 0.97 | 0.99 | 0.85 |
| | | Layer C/Layer B | — | 1.02 | 1.02 | 1.02 | 1.02 | — | — |
| | Difference in compatibility parameters | | $(cal/cm^3)^{1/2}$ | 0.5 | 0.5 | 0.5 | 0.5 | 2.6 | 1.6 |

TABLE 1-continued

| | | | | | | | | | |
|---|---|---|---|---|---|---|---|---|---|
| Film formation conditions | Extrusion temperature | Layer A | ° C. | 270 | 270 | 270 | 270 | 270 | 290 |
| | | Layer B | ° C. | 290 | 290 | 290 | 290 | 260 | 260 |
| | | Layer C | ° C. | 290 | 290 | 290 | 290 | — | — |
| | | Feed block | ° C. | 280 | 280 | 280 | 280 | 270 | 270 |
| | Stretching ratio (length/width) | | Times/Times | 3.0/3.0 | 3.0/3.0 | 3.0/3.0 | 3.0/3.0 | 3.0/3.0 | 3.5/3.5 |
| | Longitudinal stretching temperature | | ° C. | 85 | 85 | 85 | 85 | 85 | 140 |
| | Transverse stretching temperature | | ° C. | 85 | 85 | 85 | 85 | 85 | 140 |
| | Heat treatment temperature | | ° C. | 190 | 190 | 190 | 190 | 90 | 180 |
| Evaluation results | Interface thickness | Interface showing lowest numerical value | — | B-C | B-C | B-C | B-C | A-B | A-B |
| | | Interface thickness/Film thickness | — | 8.0E−04 | 8.0E−04 | 8.0E−04 | 8.0E−04 | 5.0E−05 | 9.0E−05 |
| | Adhesion | Cross-cut/Peeling rate | | 27 | 30 | 26 | 24 | 100 | 100 |
| | Orientation | Plane orientation coefficient fn | — | 0.12 | 0.12 | 0.12 | 0.12 | 0.12 | 0.27 |
| | Spectral characteristics (Band II1) | λ | nm | 1100 | 1050 | 1120 | 1150 | — | 1550 |
| | | λmax | nm | 1300 | 1200 | 1260 | 1300 | — | 1900 |
| | | λmin | nm | 900 | 900 | 980 | 1000 | — | 1200 |
| | | Baseline reflectance | % | 5 | 6 | 5 | 5 | 5 | 7 |
| | | S/ (λ · N) | % | 0.053 | 0.038 | 0.025 | 0.022 | — | 0.310 |
| | Reflection chroma C* | | — | 29.6 | 33.1 | 24.8 | 11.5 | 1.3 | 76.9 |
| | Appearance (flow mark) | | — | C | B | A | A | D | D |

The ratio of the interface layer thickness analyzed by GCIB-TOF-SIMS to the film thickness (in the table, Interface thickness/Film thickness) is indicated by E notation. Hereinafter, the same applies to Tables 2 and 3.

TABLE 2

| | | | | Example 13 | Example 14 | Example 15 | Example 16 | Example 17 | Example 18 |
|---|---|---|---|---|---|---|---|---|---|
| Laminated film | Resin | Layer A | — | Resin 4 | Resin 4 | Resin 4 | Resin 4 | Resin 4 | Resin 4 |
| | | Layer B | — | Resin 8 | Resin 2 | Resin 2 | Resin 2 | Resin 2 | Resin 9 |
| | | Layer C | — | — | Resin 8 | Resin 8 | Resin 8 | Resin 8 | Resin 8 |
| | Additive | Additive layer | Layer | — | — | — | — | — | — |
| | | Additive concentration | — | — | — | — | — | — | — |
| | Film configuration | Number of lamination | Layer | 101 | 101 | 301 | 601 | 601 | 601 |
| | | Repeating unit | — | AB | ABCB | ABCB | ABCB | ABCB | ABCB |
| | | Number of units | Number | 50 | 25 | 75 | 150 | 150 | 150 |
| | | Type of outermost layer | Layer | A | A | A | A | A | A |
| | | Outermost layer thickness | Times | 30 | 30 | 30 | 30 | 30 | 30 |
| | | Inclined structure | — | Monotonic increase | Monotonic increase | Monotonic increase | Monotonic increase | Monotonic increase | Monotonic increase |
| | | Distribution gradient | — | 1.3 | 1.3 | 2.0 | 2.0 | 2.0 | 2.0 |
| | | Film thickness | μm | 35 | 35 | 30 | 28 | 28 | 28 |
| | Lamination ratio in repeating unit | Layer A/layer B | — | 0.86 | 0.93 | 0.93 | 0.93 | 0.93 | 0.93 |
| | | Layer C/Layer B | — | — | 1.08 | 1.08 | 1.08 | 1.08 | 1.08 |
| | Difference in compatibility parameters | | $(cal/cm^3)^{1/2}$ | 1.5 | 1.0 | 1.0 | 1.0 | 1.0 | 0.8 |
| Film formation conditions | Extrusion temperature | Layer A | ° C. | 280 | 280 | 280 | 280 | 280 | 280 |
| | | Layer B | ° C. | 270 | 270 | 270 | 270 | 270 | 270 |
| | | Layer C | ° C. | 270 | 270 | 270 | 270 | 270 | 270 |
| | | Feed block | ° C. | 270 | 270 | 270 | 270 | 270 | 270 |
| | Stretching ratio (length/width) | | Times/Times | 3.5/3.5 | 3.5/3.5 | 3.5/3.5 | 3.5/3.5 | 3.5/3.5 | 3.5/3.5 |
| | Longitudinal stretching temperature | | ° C. | 110 | 110 | 110 | 110 | 110 | 110 |
| | Transverse stretching temperature | | ° C. | 110 | 110 | 110 | 110 | 110 | 110 |
| | Heat treatment temperature | | ° C. | 190 | 190 | 190 | 190 | 220 | 220 |
| Evaluation results | Interface thickness | Interface showing lowest numerical value | — | A-B | B-C | B-C | B-C | B-C | A-B, B-C |
| | | Interface thickness/Film thickness | — | 5.0E−04 | 1.4E−03 | 1.8E−03 | 1.6E−03 | 2.5E−03 | 4.2E−03 |
| | Adhesion | Cross-cut/Peeling rate | % | 42 | 10 | 10 | 9 | 1 | 0 |
| | Orientation | Plane orientation coefficient fn | — | 0.21 | 0.21 | 0.21 | 0.21 | 0.23 | 0.23 |

TABLE 2-continued

| | | | | | | | | | |
|---|---|---|---|---|---|---|---|---|---|
| | Spectral characteristics (Band II1) | λ | nm | 2150 | 799 | 1112 | 590 | 590 | 590 |
| | | λmax | nm | 2500 | 994 | 1500 | 800 | 800 | 800 |
| | | λmin | nm | 1800 | 604 | 723 | 380 | 380 | 380 |
| | | Baseline reflectance | % | 8 | 6 | 6 | 6 | 6 | 6 |
| | | S/ (λ · N) | % | 0.30 | 0.15 | 0.14 | 0.11 | 0.11 | 0.11 |
| | Reflection chroma C* | | — | 65.0 | 28.3 | 10.0 | 0.8 | 0.8 | 0.8 |
| | Appearance (flow mark) | | — | A | A | A | A | A | A |

| | | | | Example 19 | Example 20 | Example 21 | Example 22 | Comparative Example 3 |
|---|---|---|---|---|---|---|---|---|
| Laminated film | Resin | Layer A | — | Resin 4 | Resin 4 | Resin 4 | Resin 4 | Resin 4 |
| | | Layer B | — | Resin 2 | Resin 2 | Resin 2 | Resin 2 | Resin 11 |
| | | Layer C | — | Resin 8 | Resin 8 | Resin 8 | Resin 8 | Resin 8 |
| | Additive | Additive layer | Layer | Layer B | Layer B | Layer C | Layer C | — |
| | | Additive concentration | — | 2.5 | 2.5 | 2.5 | 2.5 | — |
| | Film configuration | Number of lamination | Layer | 601 | 601 | 601 | 601 | 601 |
| | | Repeating unit | — | ABCB | ABCB | ABCB | ABCB | ABCB |
| | | Number of units | Number | 150 | 150 | 150 | 150 | 150 |
| | | Type of outermost layer | Layer | A | A | A | A | A |
| | | Outermost layer thickness | Times | 30 | 30 | 30 | 30 | 30 |
| | | Inclined structure | — | Monotonic increase | Monotonic increase | Monotonic increase | Monotonic increase | Monotonic increase |
| | | Distribution gradient | — | 2.0 | 2.0 | 2.0 | 2.0 | 2.0 |
| | | Film thickness | μm | 28 | 28 | 28 | 28 | 28 |
| | Lamination ratio in repeating unit | Layer A/layer B | — | 0.93 | 0.93 | 0.93 | 0.93 | 0.93 |
| | | Layer C/Layer B | — | 1.08 | 1.08 | 1.08 | 1.08 | 1.08 |
| | Difference in compatibility parameters | | $(cal/cm^3)^{1/2}$ | 1.0 | 1.0 | 1.0 | 1.0 | 1.3 |
| Evaluation results ditions | Extrusion temperature | Layer A | | 280 | 280 | 280 | 280 | 280 |
| | | Layer B | | 270 | 270 | 270 | 270 | 270 |
| | | Layer C | | 270 | 270 | 270 | 270 | 280 |
| | | Feed block | | 270 | 270 | 270 | 270 | 270 |
| | Stretching ratio (length/width) | | Times/Times | 3.5/3.5 | 3.5/3.5 | 3.5/3.5 | 3.5/3.5 | 3.5/3.5 |
| | Longitudinal stretching temperature | | ° C. | 110 | 110 | 110 | 110 | 110 |
| | Transverse stretching temperature | | ° C. | 110 | 110 | 110 | 110 | 110 |
| | Heat treatment temperature | | ° C. | 180 | 220 | 180 | 220 | 190 |
| Evaluation results | Interface | Interface showing lowest numerical value | — | B-C | A-B | B-C | A-B | B-C |
| | thickness | Interface thickness/Film thickness | — | 2.7E−03 | 3.4E−03 | 2.8E−03 | 3.6E−05 | 9.0E−03 |
| | Adhesion | Cross-cut/Peeling rate | — | 0 | 0 | 0 | 0 | 100 |
| | Orientation | Plane orientation coefficient fn | — | 0.21 | 0.23 | 0.21 | 0.23 | 0.23 |
| | Spectral characteristics (Band II1) | λ | nm | 590 | 590 | 590 | 590 | 590 |
| | | λmax | nm | 800 | 800 | 800 | 800 | 800 |
| | | λmin | nm | 380 | 380 | 380 | 380 | 380 |
| | | Baseline reflectance | % | 6 | 6 | 6 | 6 | 6 |
| | | S/ (λ · N) | % | 0.11 | 0.11 | 0.11 | 0.11 | 0.11 |
| | Reflection chroma C* | | — | 0.8 | 0.8 | 0.8 | 0.8 | 0.8 |
| | Appearance (flow mark) | | — | A | A | A | A | D |

TABLE 3

| | | | | Example 23 | Example 24 | Example 25 | Example 26 | Example 27 |
|---|---|---|---|---|---|---|---|---|
| Laminated film | Resin | Layer A | — | Resin 4 | Resin 4 | Resin 4 | Resin 4 | Resin 4 |
| | | Layer B | — | Resin 2 | Resin 2 | Resin 2 | Resin 2 | Resin 2 |
| | | Layer C | — | Resin 8 | Resin 8 | Resin 8 | Resin 8 | Resin 8 |
| | Additive | Additive layer | Layer | — | — | — | — | — |
| | | Additive concentration | — | — | — | — | — | — |
| | Film configuration | Number of lamination | Layer | 601 | 601 | 601 | 601 | 601 |
| | | Repeating unit | — | ABCB | ABCB | ABCB | ABCB | ABCB |
| | | Number of units | Number | 150 | 150 | 150 | 150 | 150 |
| | | Type of outermost layer | Layer | A | A | A | A | A |
| | | Outermost layer thickness | Times | 30 | 30 | 30 | 30 | 30 |

TABLE 3-continued

| | | | | | | | | |
|---|---|---|---|---|---|---|---|---|
| | | Inclined structure | — | Monotonic increase | Monotonic increase | Monotonic increase | Monotonic increase | Monotonic increase |
| | | Distribution gradient | — | 2.0 | 2.0 | 2.0 | 2.0 | 2.0 |
| | | Film thickness | μm | 60 | 60 | 60 | 60 | 60 |
| | Lamination ratio in repeating unit | Layer A/layer B | — | 0.93 | 0.93 | 0.70 | 0.80 | 0.80 |
| | | Layer C/Layer B | — | 1.08 | 1.08 | 0.80 | 0.90 | 1.30 |
| | Difference in compatibility parameters | | $(cal/cm^3)^{1/2}$ | 1.0 | 1.0 | 1.0 | 1.0 | 1.0 |
| Film formation conditions | Extrusion temperature | Layer A | ° C. | 280 | 280 | 280 | 280 | 280 |
| | | Layer B | ° C. | 270 | 270 | 270 | 270 | 270 |
| | | Layer C | ° C. | 270 | 270 | 270 | 270 | 270 |
| | | Feed block | ° C. | 270 | 270 | 270 | 270 | 270 |
| | Stretching ratio (length/width) | | Times/Times | 3.5/3.5 | 3.5/3.5 | 3.5/3.5 | 3.5/3.5 | 3.5/3.5 |
| | Longitudinal stretching temperature | | ° C. | 110 | 110 | 110 | 110 | 110 |
| | Transverse stretching temperature | | ° C. | 110 | 110 | 110 | 110 | 110 |
| | Heat treatment temperature | | ° C. | 220 | 190 | 220 | 220 | 220 |
| Evaluation results | Interface thickness | Interface showing lowest numerical value | — | B-C | B-C | B-C | B-C | B-C |
| | | Interface thickness/Film thickness | — | 2.5E−03 | 1.5E−03 | 2.5E−03 | 2.5E−03 | 2.5E−03 |
| | Adhesion | Cross-cut/Peeling rate | % | 0 | 10 | 0 | 0 | 0 |
| | Orientation | Plane orientation coefficient fn | — | 0.23 | 0.21 | 0.23 | 0.23 | 0.23 |
| | Spectral characteristics (Band II1) | λ | nm | 1225 | 1225 | 1270 | 1225 | 1225 |
| | | λmax | nm | 1650 | 1650 | 1740 | 1680 | 1650 |
| | | λmin | nm | 800 | 800 | 800 | 770 | 800 |
| | | Baseline reflectance | % | 6 | 6 | 6 | 6 | 6 |
| | | S/ (λ · N) | % | 0.10 | 0.10 | 0.10 | 0.10 | 0.10 |
| | Reflection chroma C* | | — | 4.5 | 0.8 | 16.6 | 9.7 | 9.1 |
| | Appearance (flow mark) | | — | A | A | A | A | A |

| | | | | Example 28 | Example 29 | Example 30 | Example 31 | Example 32 |
|---|---|---|---|---|---|---|---|---|
| Laminated film | Resin | Layer A | — | Resin 4 | Resin 4 | Resin 4 | Resin 4 | Resin 4 |
| | | Layer B | — | Resin 2 | Resin 2 | Resin 2 | Resin 2 | Resin 2 |
| | | Layer C | — | Resin 8 | Resin 8 | Resin 8 | Resin 8 | Resin 8 |
| | Additive | Additive layer | Layer | — | — | — | — | — |
| | | Additive concentration | | — | — | — | — | — |
| | Film configuration | Number of lamination | Layer | 601 | 601 | 601 | 601 | 601 |
| | | Repeating unit | | ABCB | ABCB | ABCB | ABCB | ABCB |
| | | Number of units | Number | 150 | 150 | 150 | 150 | 150 |
| | | Type of outermost layer | Layer | A | A | A | A | A |
| | | Outermost layer thickness | Times | 30 | 30 | 30 | 30 | 30 |
| | | Inclined structure | — | Monotonic increase | Monotonic increase | Monotonic increase | Monotonic increase | Monotonic increase |
| | | Distribution gradient | — | 2.0 | 2.0 | 2.0 | 2.0 | 2.0 |
| | | Film thickness | μm | 60 | 60 | 60 | 60 | 60 |
| | Lamination ratio in repeating unit | Layer A/layer B | — | 1.10 | 1.10 | 1.30 | 1.30 | 1.40 |
| | | Layer C/Layer B | — | 0.90 | 1.30 | 0.90 | 1.30 | 1.40 |
| | Difference in compatibility parameters | | $(cal/cm^3)^{1/2}$ | 1.0 | 1.0 | 1.0 | 1.0 | 1.0 |
| Film formation conditions | Extrusion temperature | Layer A | ° C. | 280 | 280 | 280 | 280 | 280 |
| | | Layer B | ° C. | 270 | 270 | 270 | 270 | 270 |
| | | Layer C | ° C. | 270 | 270 | 270 | 270 | 270 |
| | | Feed block | ° C. | 270 | 270 | 270 | 270 | 270 |
| | Stretching ratio (length/width) | | Times/ Times | 3.5/3.5 | 3.5/3.5 | 3.5/3.5 | 3.5/3.5 | 3.5/3.5 |
| | Longitudinal stretching temperature | | ° C. | 110 | 110 | 110 | 110 | 110 |
| | Transverse stretching temperature | | ° C. | 110 | 110 | 110 | 110 | 110 |
| | Heat treatment temperature | | ° C. | 220 | 220 | 220 | 220 | 220 |
| Evaluation results | Interface thickness | Interface showing lowest numerical value | — | B-C | B-C | B-C | B-C | B-C |
| | | Interface thickness/Film thickness | — | 2.5E−03 | 2.5E−03 | 2.5E−03 | 2.5E−03 | 2.5E−03 |
| | Adhesion | Cross-cut/Peeling rate | % | 0 | 0 | 0 | 0 | 0 |
| | Orientation | Plane orientation coefficient fn | — | 0.23 | 0.23 | 0.23 | 0.23 | 0.23 |

TABLE 3-continued

| | | | | | | | |
|---|---|---|---|---|---|---|---|
| Spectral | λ | nm | 1215 | 1215 | 1270 | 1260 | 1270 |
| characteristics | λmax | nm | 1680 | 1680 | 1740 | 1720 | 1730 |
| (Band II1) | λmin | nm | 750 | 750 | 800 | 800 | 810 |
| | Baseline reflectance | % | 6 | 6 | 6 | 6 | 6 |
| | S/ (λ · N) | % | 0.11 | 0.11 | 0.10 | 0.11 | 0.11 |
| Reflection chroma C* | | — | 8.6 | 9.3 | 10.0 | 10.0 | 12.6 |
| Appearance (flow mark) | | — | A | A | A | A | |

INDUSTRIAL APPLICABILITY

With the laminated film of the present invention that has a laminated film design in which the interface layer thicknesses of all the layer interfaces formed of the thermoplastic resin constituting the film are controlled within a specific range, it is possible to obtain a laminated film in which lamination disorder and delamination are suppressed even when a plurality of types of thermoplastic resins having different skeleton structures and viscoelastic characteristics are co-extruded and laminated. As a result, it can be expected to expand the range of new functional addition beyond the trade-off frame as compared with the conventional technique in which only thermoplastic resins having the same type of skeleton structure can be laminated. In addition, since delamination hardly occurs, a different material resin laminated film suitable for long-term practical use can be obtained, and the film can be used for a peel resistant film, a scattering preventing film, and the like. Further, in the case of using a light interference reflection technology with a laminated structure, since a refractive index difference and the like can be further increased by a different material resin, improvement in reflection performance can be expected, and the light interference reflection technology can also be used for applications such as a window film, a decorative film, an in-vehicle member, and an optical film for a display.

DESCRIPTION OF REFERENCE SIGNS

- 1: Ionic strength spectrum of component contained in thermoplastic resin constituting thermoplastic resin layer A
- 2: Ionic strength spectrum of component contained in thermoplastic resin constituting thermoplastic resin layer B
- 3: Ionic strength spectrum of component contained in thermoplastic resin constituting thermoplastic resin layer C
- 4: Ionic strength spectrum
- 5: Linear line of ionic strength corresponding to each thermoplastic resin layer
- 6: Tangential line at inflection point of ionic strength rising portion corresponding to interface portion
- 7: Interface layer thickness
- 8: Layer A
- 9: Layer B
- 10: Repeating unit
- 11: Optical spectrum
- 12: Region area S of wavelength band Π1
- 13: High-order reflection
- 14: Center wavelength λ of wavelength band Π1
- 15: λmin of wavelength band Π1
- 16: λmax of wavelength band Π1
- 17: Maximum reflectance of wavelength band Π1
- 18: Intermediate value between maximum reflectance and baseline reflectance of wavelength band Π1
- 19: Baseline reflectance
- 20: Pulsating flow of optical spectrum

The invention claimed is:

1. A laminated film comprising three different types of thermoplastic resin layers, wherein when the three different types of thermoplastic resin layers are a layer A, a layer B, and a layer C in this order from an outermost layer, the laminated film has a repeating unit in which the layer A, the layer B, the layer C, and the layer B are arranged in this order, wherein the laminated film has a lowest value of a ratio of an interface layer thickness to a film thickness of $1.4\times10^{-3}$ or more and $1.0\times10^{-2}$ or less in all types of interfaces formed of the different types of thermoplastic resin layers, the interface layer thickness being analyzed through GCIB-TOF-SIMS, and wherein a grid peeling rate of the laminated film in an adhesion test based on a cross-cut method defined in JIS K 5600 May 6:1999 is 10% or less.

2. The laminated film according to claim 1, wherein when a thermoplastic resin as a main component of the layer A is a thermoplastic resin A and a thermoplastic resin as a main component of the layer C is a thermoplastic resin C, the layer B includes a thermoplastic resin obtained by blending, copolymerizing, or alloying the thermoplastic resin A and the thermoplastic resin C as a main component.

3. The laminated film according to claim 1, wherein the laminated film satisfies $0.060 \leq S/(\lambda \cdot N) \leq 0.300$, where, in an optical spectrum in a wavelength band of 300 nm or more and 2500 nm or less in which a horizontal axis represents a wavelength (nm) and a vertical axis represents a reflectance (%), a wavelength band continuously showing a reflectance of 20% or more over 100 nm or more positioned in the longest wavelength band is a wavelength band Π1, λ is a center wavelength in the wavelength band Π1, S is a region area surrounded by the optical spectrum of the wavelength band Π1 and a baseline of the reflectance, and N is a total lamination number of the thermoplastic resin layers of the laminated film.

4. The laminated film according to claim 1, wherein in the repeating unit, a lamination ratio (A/B) of the layer A to the layer B is 0.50 or more and 1.30 or less, and a lamination ratio (C/B) of the layer C to the layer B is 0.90 or more and 1.30 or less.

5. The laminated film according to claim 1, wherein the laminated film has a chroma C* of 10.0 or less in reflection (SCI).

6. The laminated film according to claim 1, wherein the outermost layer on both sides is the layer A.

7. The laminated film according to claim 1, wherein the laminated film continuously has five or more repeating units formed of three different types of thermoplastic resin layers.

8. The laminated film according to claim 1, wherein a thickness of a thermoplastic resin layer positioned at the outermost layer is 10 times or more and 100 times or less an average value of thicknesses of same thermoplastic resin layers excluding the outermost layer.

9. The laminated film according to claim 1, wherein a thermoplastic resin layer disposed on an outermost surface of the laminated film has a plane orientation coefficient fn of 0.01 or more and 0.30 or less.

10. A molded body comprising the laminated film according to claim 1.

11. An image display device comprising the molded body according to claim 10.

12. A window comprising the molded body according to claim 10.

13. A transportation facility exterior member comprising the molded body according to claim 10.

14. An image display device comprising the laminated film according to claim 1.

15. A window comprising the laminated film according to claim 1.

16. A transportation facility exterior member comprising the laminated film according to claim 1.

17. A transportation facility comprising at least one of the laminated film according to claim 1.

* * * * *